(12) United States Patent
Kobayashi

(10) Patent No.: US 12,511,971 B2
(45) Date of Patent: Dec. 30, 2025

(54) CURRENCY PROCESSING METHOD AND CURRENCY PROCESSING DEVICE

(71) Applicant: GLORY LTD., Hyogo (JP)

(72) Inventor: Kiyoaki Kobayashi, Hyogo (JP)

(73) Assignee: GLORY LTD., Hyogo (JP)

( * ) Notice: Subject to any disclaimer, the term of this patent is extended or adjusted under 35 U.S.C. 154(b) by 77 days.

(21) Appl. No.: 18/494,798

(22) Filed: Oct. 26, 2023

(65) Prior Publication Data
US 2024/0054843 A1 Feb. 15, 2024

Related U.S. Application Data

(63) Continuation of application No. PCT/JP2022/018582, filed on Apr. 22, 2022.

(30) Foreign Application Priority Data

Apr. 30, 2021 (JP) .................. 2021-077631

(51) Int. Cl.
| | | |
|---|---|---|
| *G07D 11/13* | (2019.01) | |
| *G06Q 20/10* | (2012.01) | |
| *G06Q 20/20* | (2012.01) | |
| *G07D 1/06* | (2006.01) | |
| *G07D 11/125* | (2019.01) | |
| *G07D 11/25* | (2019.01) | |
| *G07D 11/34* | (2019.01) | |

(52) U.S. Cl.
CPC ......... *G07D 11/13* (2019.01); *G06Q 20/1085* (2013.01); *G06Q 20/20* (2013.01); *G07D 1/06* (2013.01); *G07D 11/125* (2019.01); *G07D 11/25* (2019.01); *G07D 11/34* (2019.01); *G07D 2201/00* (2013.01); *G07D 2211/00* (2013.01)

(58) Field of Classification Search
CPC ...... G07D 11/13; G07D 11/125; G07D 11/25; G07D 11/34; G07D 1/06; G07D 2201/00; G07D 2211/00; G06Q 20/1085
See application file for complete search history.

(56) References Cited

U.S. PATENT DOCUMENTS

| 9,117,327 B1 | 8/2015 | Wasil |
| 2014/0290539 A1 | 10/2014 | Tagashira et al. |
| 2017/0278358 A1* | 9/2017 | Ino .................. G07F 19/203 |

FOREIGN PATENT DOCUMENTS

| JP | 11-306443 A | 11/1999 |
| JP | 2000-231668 A | 8/2000 |

(Continued)

OTHER PUBLICATIONS

European Extended Search Report dated Sep. 9, 2024.

*Primary Examiner* — Laura A Gudorf
(74) *Attorney, Agent, or Firm* — Shih IP Law Group, PLLC.

(57) ABSTRACT

This currency processing method is implemented by a currency processing device having first and second currency storages for storing currency in a dispensable manner, and involves: receiving a dispensation instruction regarding a selected transaction and based on the type of said transaction; executing a dispensing process regarding the transaction by using the first currency storage when the type of the transaction is a first type; and executing the dispensing process regarding the transaction by using the second currency storage when the type of the transaction is a second type.

15 Claims, 12 Drawing Sheets

(56) References Cited

FOREIGN PATENT DOCUMENTS

| | | |
|---|---|---|
| JP | 2000-259948 A | 9/2000 |
| JP | 5296191 B2 | 9/2013 |
| JP | 2018-005798 A | 1/2018 |
| WO | 2011121736 A1 | 10/2011 |
| WO | 2013047344 A1 | 4/2013 |

* cited by examiner

CURRENCY PROCESSING METHOD AND CURRENCY PROCESSING DEVICE

TECHNICAL FIELD

The present disclosure relates to a money handling method and a money handling apparatus.

BACKGROUND ART

Conventionally, a money handling machine that performs money deposit/withdrawal process has been known.

For example, the money handling machine comprises a recycling-type money storing/feeding section under a store-side management authorization (under a first management authorization) and a money storage section under a specified-collection-personnel side management authorization (under a second management authorization). The money handling machine stores, in the recycling-type money storing/feeding section, money deposited in a transaction at the store, and dispenses money from the recycling-type money storing/feeding section when change is required. When the amount of the money stored in the recycling-type money storing/feeding section reaches a set amount, the money handling machine performs a transfer process of moving the money in the recycling-type money storing/feeding section to the money storage section.

SUMMARY

A money handling method according to the present disclosure is a money handling method performed by a money handling apparatus comprising a first money storage section and a second money storage section that store money such that the money is capable of being dispensed, the money handling method comprising: receiving a withdrawal instruction that is based on a type of a selected transaction and relates to the selected transaction; performing a withdrawal process relating to the selected transaction using the first money storage section when the type of the selected transaction is a first type; and performing a withdrawal process relating to the selected transaction using the second money storage section when the type of the selected transaction is a second type.

DESCRIPTION OF EMBODIMENTS

Figure 1:
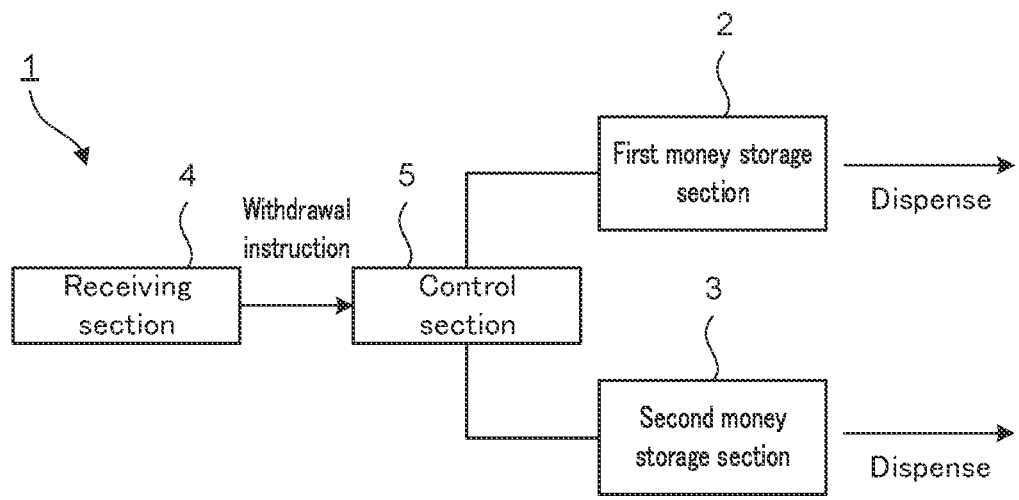
FIG. 1 is a block diagram illustrating a schematic configuration of a money handling apparatus according to Embodiment 1.

In the money handling method according to the present disclosure, the withdrawal instruction may include information on the type of the selected transaction or information on a money storage section to be used.

In the money handling method according to the present disclosure, when the selected transaction of the first type relates to a settlement process, deposit and withdrawal information on the first money storage section may be provided to a management system of a store in which the money handling apparatus is installed, and when the selected transaction of the second type relates to a financial transaction, deposit and withdrawal information on the second money storage section may be provided to a management system of a financial institution.

In the money handling method according to the present disclosure, the first money storage section and the second money storage section may store money of a same denomination, and the withdrawal process may be performed by selectively using the first money storage section and the second money storage section.

In the money handling method according to the present disclosure, the first money storage section and the second money storage section may store money of a same denomination, and a money transport process may be performed between the first money storage section and the second money storage section.

In the money handling method according to the present disclosure, deposit and withdrawal information on money in the second money storage section for the money transport process may be stored in a memory section or provided to a management system of a financial institution.

A money handling apparatus according to the present disclosure comprises: a first money storage section and a second money storage section that store money such that the money is capable of being fed in or out of the first money storage section and the second money storage section; a first unit that houses the first money storage section; and a second unit that houses the second money storage section and comprises a locking mechanism capable of being unlocked by a person having a predetermined authorization.

In the money handling apparatus according to the present disclosure, the second unit may comprise a locking mechanism managed by a financial institution.

The money handling apparatus according to the present disclosure may further comprise: a control section configured to receive a withdrawal instruction that is based on a type of a transaction and relates to the transaction, the control section being configured to perform a withdrawal process using the first money storage section when the type of the transaction is a first type, and perform the withdrawal process using the second money storage section when the type of the transaction is a second type.

In the money handling apparatus according to the present disclosure, the withdrawal instruction may include information on the type of the transaction or information on a money storage section to be used.

In the money handling apparatus according to the present disclosure, when the transaction of the first type relates to a settlement process, the control section may provide deposit and withdrawal information on the first money storage section to a management system of a store in which the money handling apparatus is installed, and when the transaction of the second type relates to a financial transaction, the control section may provide deposit and withdrawal information on the second money storage section to a management system of a financial institution.

In the money handling apparatus according to the present disclosure, the first money storage section and the second money storage section may store money of a same denomination, and the control section may perform the withdrawal process by selectively using the first money storage section and the second money storage section.

The money handling apparatus according to the present disclosure may further comprise: a control section, in which the first money storage section and the second money storage section may store money of a same denomination, and the control section may perform a deposit/withdrawal process using the first money storage section or a money transport process between the first money storage section and the second money storage section.

In the money handling apparatus according to the present disclosure, the control section may store, in a memory section, deposit and withdrawal information on money in the second money storage section for the money transport process or provide the deposit and withdrawal information to a management system of a financial institution.

The money handling apparatus according to the present disclosure may further comprise the control section, in which the first money storage section and the second money storage section store first currency and second currency, respectively, and the control section may perform a deposit/withdrawal process using the first money storage section or a change dispensing process for dispensing change from the first money storage section for a deposit process for deposit in the second money storage section.

The money handling apparatus according to the present disclosure may further comprise: a detachable collection section, in which the control section may transport a part of the first currency to the detachable collection section during the deposit/withdrawal process performed using the first money storage section, the control section also being configured to transport the second currency in the second money storage section to the detachable collection section in response to an operation instruction by an operator outside operating hours of the money handling apparatus.

Embodiment 1

Embodiment 1 will be described with reference to the drawings.

<Configuration of Money Handling Apparatus>

To begin with, a money handling apparatus of Embodiment 1 will be described. FIG. 1 is a block diagram illustrating a schematic configuration of the money handling apparatus according to Embodiment 1.

The money handling apparatus 1 illustrated in FIG. 1 performs a withdrawal process for withdrawal/dispensing of money. The money may be a banknote or a coin. The money handling apparatus 1 comprises a first money storage section 2, a second money storage section 3, a receiving section 4, and a control section 5.

The first money storage section 2 and the second money storage section 3 each store money such that the money is capable of being fed in or out of the money storage section. The first money storage section 2 and the second money storage section 3 have respective separate transport mechanisms. Each of the transport mechanisms feeds money out of the first money storage section 2 or the second money storage section 3. Note that the first money storage section 2 and the second money storage section 3 may store at least partially the same denomination of money. The first money storage section 2 and the second money storage section 3 may each comprise a plurality of denomination-based storage sections that store respective denominations of money when storing a plurality of denominations of money.

Based on an input operation on an operation section by a client as a user, the receiving section 4 receives a withdrawal instruction based on the type of transaction selected by the client.

The control section 5 performs a withdrawal process using the first money storage section 2 or the second money storage section 3 according to the type of transaction selected by the client and received by the receiving section 4. For example, the control section 5 drives a transport mechanism of a money storage section which dispenses money, to feed money corresponding to a withdrawal amount from the money storage section to dispense the money from a dispensing section via a transport path.

<Operation of Money Handling Apparatus>

Figure 2:
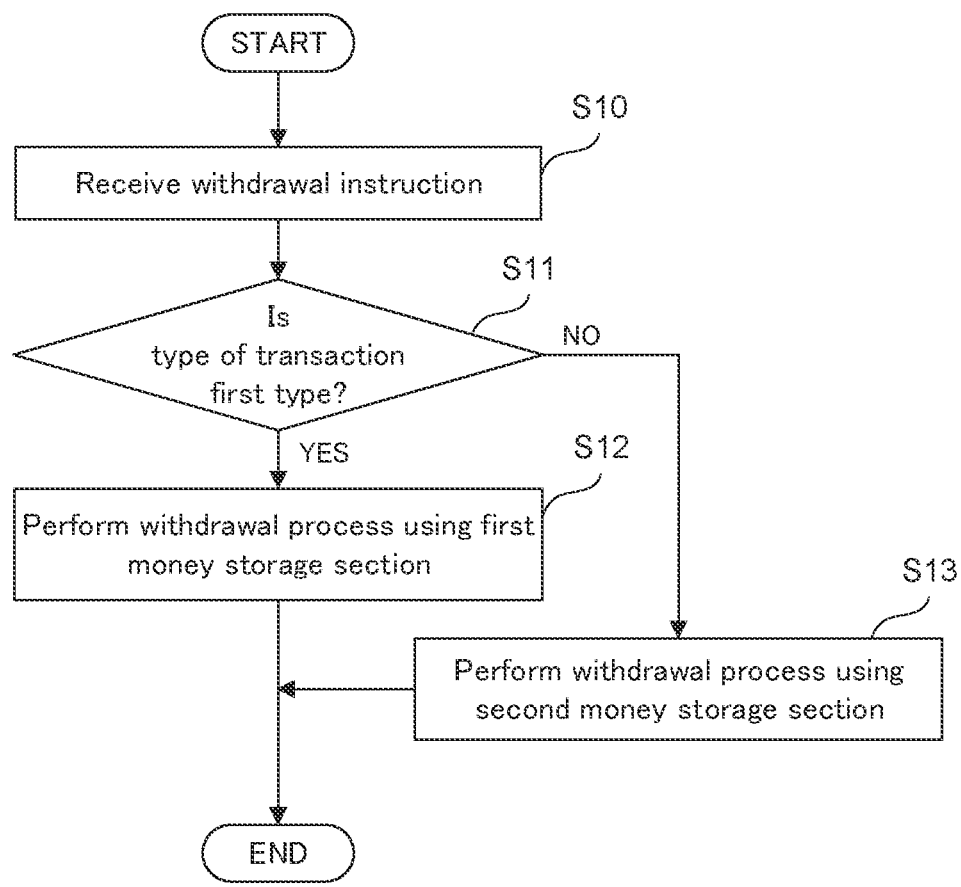
FIG. 2 is a flowchart of a deposit/withdrawal process according to Embodiment 1.

Next, the operation of the money handling apparatus will be described. FIG. 2 is a flowchart of a deposit/withdrawal process according to Embodiment 1.

To begin with, as illustrated in FIG. 2, the receiving section 4 receives a withdrawal instruction based on the type of transaction selected by the client (step S10). The control section 5 determines whether or not the type of transaction received by the receiving section 4 is the first type (step S11).

In case that the control section 5 determines that the type of transaction is the first type (step S11: YES), the control section 5 performs a withdrawal process using the first money storage section 2 (step S12). Settlement of a commodity or the like can be exemplified as the first type of transaction. When the withdrawal process based on the settlement is performed, the paid money may be put in a money handling apparatus dedicated to deposit, and change may be dispensed from the first money storage section 2. In addition, for the payment by a voucher or the like, the change may be dispensed from the first money storage section 2.

On the other hand, in case that the control section 5 determines that the type of transaction received by the receiving section 4 is the second type instead of the first type (step S11: NO), the control section 5 performs the withdrawal process using the second money storage section 3 (step S13). A financial transaction in which money deposited in a financial institution is withdrawn can be exemplified as the second type of transaction.

Effect of Embodiment 1

The money handling apparatus 1 performs the withdrawal process using the first money storage section 2 or the second money storage section 3 according to the type of transaction selected by the client. Thus, the client can carry out different transactions with different money storage sections by operating one money handling apparatus 1. Therefore, it is possible to provide the money handling apparatus 1 with high versatility.

Embodiment 2

Next, Embodiment 2 will be described with reference to the drawings. In Embodiment 2 and below-described Embodiments 3 to 5, a case will be described in which the money handling apparatus of the present disclosure is applied to a configuration for handling banknotes being one example of money. In Embodiment 2, a money handling system capable of performing a transaction with both a store and a bank using a single money handling apparatus will be described. The bank is one example of the financial institution.

<Configuration of Money Handling System>

Figure 3:
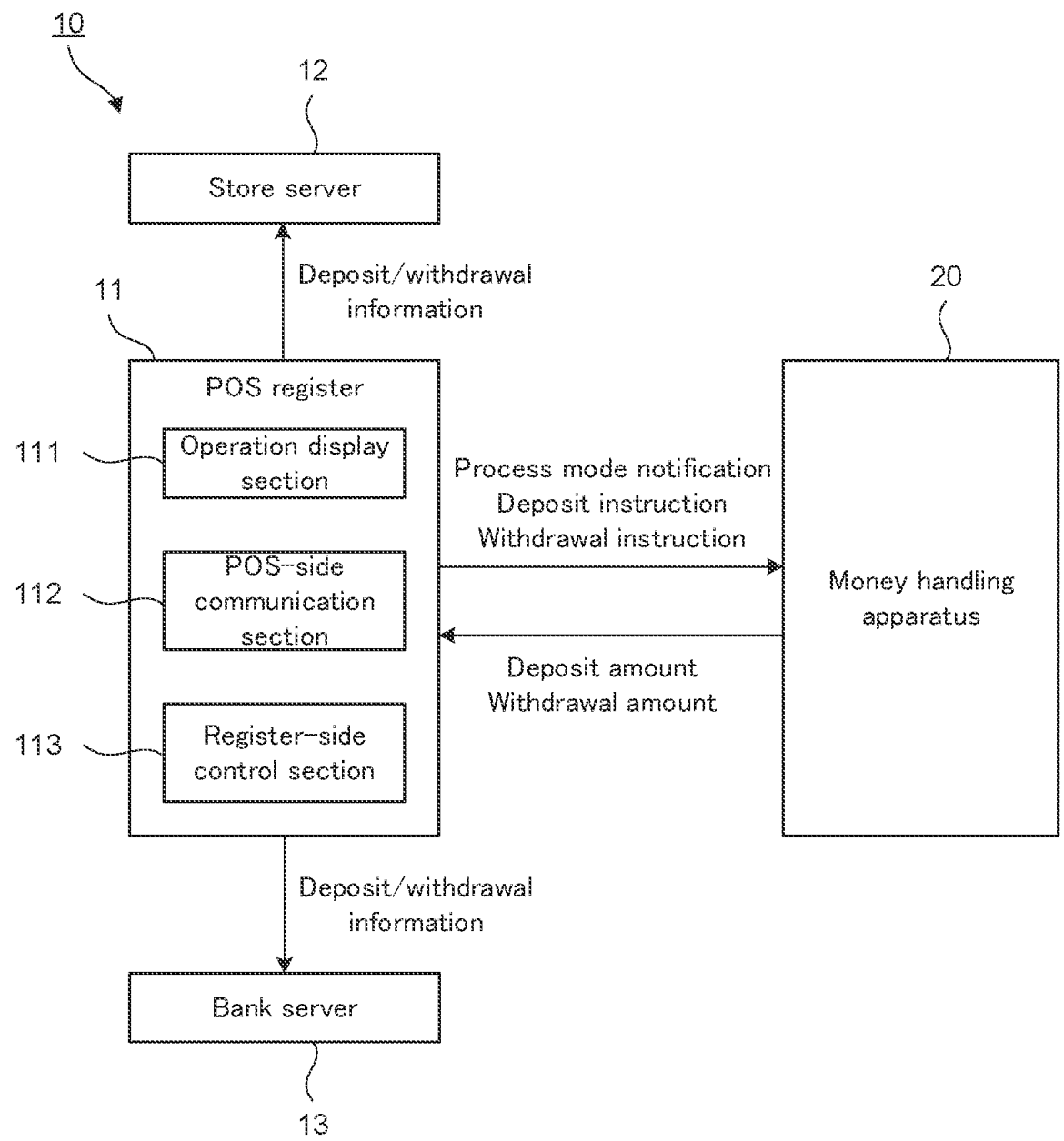
FIG. 3 is a block diagram of a money handling system according to Embodiment 2.

To begin with, a configuration of a money handling system according to Embodiment 2 will be described. FIG. 3 is a block diagram of the money handling system according to Embodiment 2.

The money handling system 10 illustrated in FIG. 3 comprises a Point Of Sales (POS) register 11, a store server 12, a bank server 13, and a money handling apparatus 20. The money handling system 10 carries out a transaction relevant to a settlement process or a financial transaction with a bank. Specifically, the money handling system 10 conducts a transaction relevant to the settlement process by the money handling apparatus 20, and provides the store server 12 with deposit and withdrawal information in the money handling apparatus 20 by the POS register 11. In addition, the money handling system 10 performs the financial transaction with the bank by the money handling apparatus 20, and provides, using the POS register 11, the bank server 13 with the deposit and withdrawal information on deposit/withdrawal by the money handling apparatus 20. The transaction relevant to the settlement process is one example of the first type of transaction. The financial transaction is one example of the second type of transaction. The POS register 11, the store server 12, and the money handling apparatus 20 are installed in a store. The bank server 13 is installed in a bank.

The POS register 11 comprises an operation display section 111, a POS-side communication section 112, and a register-side control section 113.

The operation display section 111 is comprised of a touch panel type display apparatus. The operation display section 111 displays an operation screen used for a client's input operation, and generates a signal based on the input operation on the operation screen. The operation display section 111 also functions as a display section that displays information on money handling.

The POS-side communication section 112 is connected to the store server 12, the bank server 13, and the money handling apparatus 20 via a wired medium or a radio medium. The POS-side communication section 112 is controlled by the register-side control section 113 and performs communication with the store server 12, the bank server 13, and the money handling apparatus 20.

The register-side control section 113 performs overall control on the POS register 11. Further, the register-side control section 113 instructs the money handling apparatus 20 to perform the settlement process or the deposit/withdrawal process on the bank account. The register-side control section 113 comprises, for example, a CPU (Central Processing Unit) and controls each block of the POS register 11 to implement various processes by developing and executing the program stored in memory section or cloud-base program. According to an exemplary embodiment, the control section 31 includes one or more general-purpose processing circuits, such as, for example, a microprocessor, a microcontroller, a digital signal processor, or a special-purpose processing circuit, such as an ASIC (Application Specific Integrated Circuit).

The register-side control section 113 instructs the money handling apparatus 20 to perform the settlement process, and when the deposit amount is notified by the money handling apparatus 20 in response to the instruction, the register-side control section 113 calculates change and instructs the money handling apparatus 20 to perform a withdrawal process for dispensing change, while providing the store server 12 with the deposit and withdrawal information on a settlement result.

Further, the register-side control section 113 instructs the money handling apparatus 20 to perform a deposit process for deposit to a bank account, and when the deposit amount is notified by the money handling apparatus 20 in response to the instruction, provides the bank server 13 with the deposit amount and the deposit and withdrawal information on the account of the client.

Further, the register-side control section 113 instructs the money handling apparatus 20 to perform a withdrawal process for withdrawal from the bank account, and provides the bank server 13 with the withdrawal amount and the deposit and withdrawal information on the account of the client.

The register-side control section 113 may provide the deposit and withdrawal information to the bank server 13 via store server 12.

The store server 12 forms a part of a management system of the store. The store server 12 stores, in association with, for example, the settlement date and time, the deposit amount and the withdrawal amount of the deposit and withdrawal information provided by the POS register 11. The store server 12 may acquire information on the settlement date and time from the POS register 11, or may acquire the information on the settlement date and time from a time measurement section of the management system of the store.

The bank server 13 forms a part of a management system of the bank which is one example of the financial institution. The bank server 13 stores, in association with, for example, the client's account number and the transaction date and time, the deposit amount or the withdrawal amount of the deposit and withdrawal information provided by the POS register 11. The bank server 13 may acquire the transaction date and time from the POS register 11, or may acquire the transaction date and time from a time measurement section of the management system of the bank.

Figure 4:
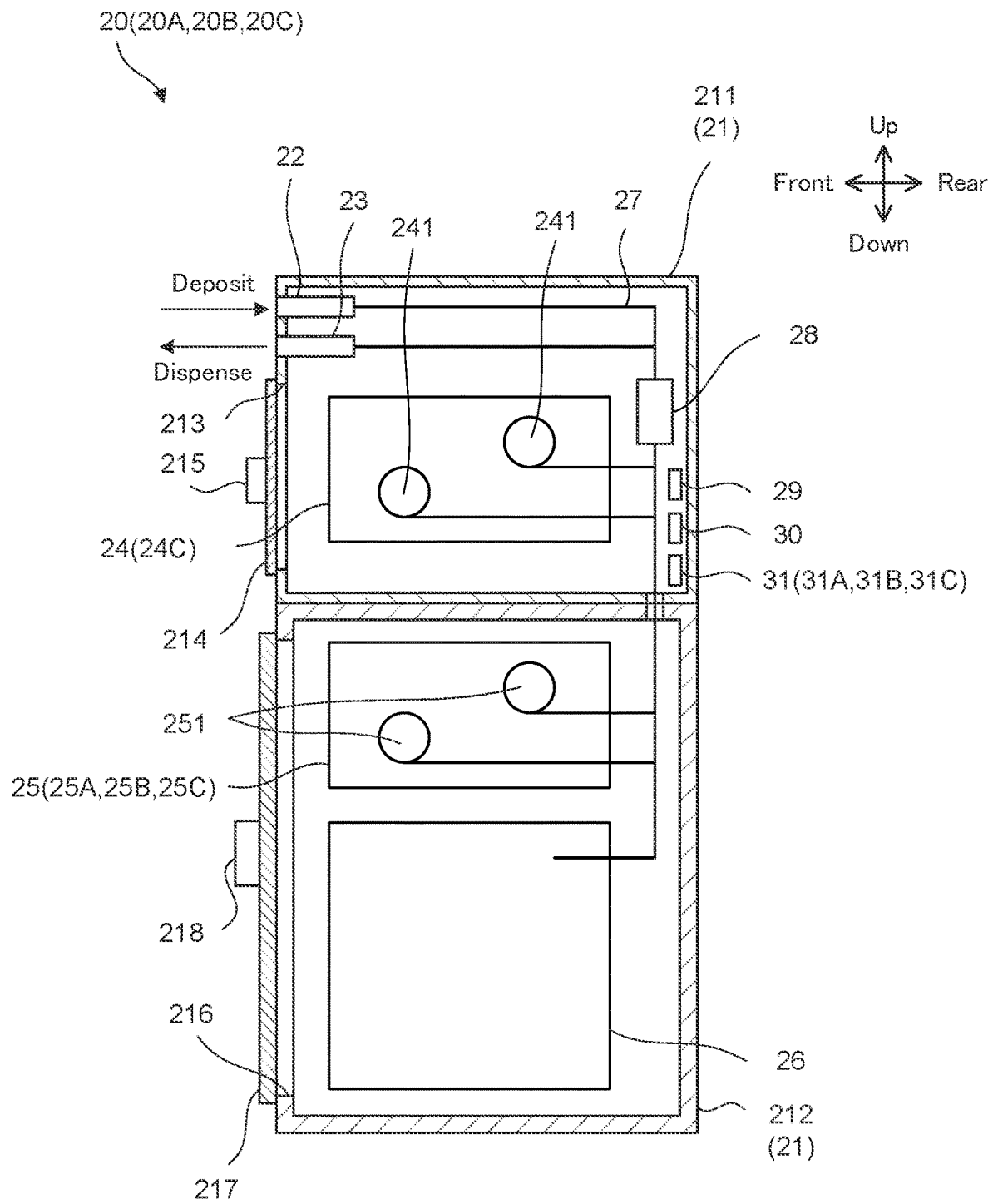
FIG. 4 is a schematic diagram of a money handling apparatus according to Embodiments 2 to 5.

Next, a detailed configuration of a money handling apparatus according to Embodiment 2 will be described. FIG. 4 is a schematic diagram of the money handling apparatus according to Embodiments 2 to 5. In some cases, the arrangement or the like of components of the money handling apparatus 20 will be described in the direction illustrated in FIG. 3.

Based on the instruction from the POS register 11, the money handling apparatus 20 deposits the payment made by a purchaser or withdraws change to be paid to the purchaser. In addition, the money handling apparatus 20 deposits money into the bank account of the client or withdraws money from the bank account of the client based on the instruction from the POS register 11. That is, the money handling apparatus 20 has a self-checkout function and an Automatic Teller Machine (ATM) function. The money handling apparatus 20 comprises a housing 21, a deposit section 22, a dispensing section 23, a first money storage section 24, a second money storage section 25, a collection section 26, a transport section 27, an recognition section 28, a communication section 29, a memory section 30, and a control section 31.

The housing 21 comprises a first unit 211 and a second unit 212.

The first unit 211 is formed in a box shape in which a first opening 213 is formed in the front surface. The first unit 211 is disposed on the second unit 212. The first unit 211 is provided with a first door 214 for opening and closing the first opening 213 and a first locking mechanism 215 for locking the first door 214. The first locking mechanism 215 is configured such that, for example, only a store clerk can lock and unlock the door. The first locking mechanism 215 may be opened and closed using a key or be configured to be unlocked by inputting a code such as a user ID and in case that the code is correct. Also, the first locking mechanism 215 may be a mechanical locking mechanism or an electromagnetic lock.

The second unit 212 has a structure functioning as a safe, and is formed in a box shape in which a second opening 216 is formed in the front surface. The second unit 212 is provided with a second door 217 for opening and closing the second opening 216 and a second locking mechanism 218 for locking the second door 217. The second locking mechanism 218 is configured such that only a person in charge of a money collection and delivery company (collection and delivery person) who is permitted to open the door, for example, by the bank can lock and unlock the door. That is, the second locking mechanism 218 is managed by the bank. The second locking mechanism 218 may be opened and closed using a key or be configured to be unlocked by inputting a code such as a user ID and in case that the code is correct. Also, the second locking mechanism 218 may be a mechanical locking mechanism or an electromagnetic lock.

The deposit section 22 is disposed on an upper portion of the front surface of the first unit 211. That is, the deposit section 22 is disposed on the side where the client stands when the money handling apparatus 20 is operated. The deposit section 22 is configured to allow a plurality of pieces of money to be accumulated in a stacked state. The deposit section 22 has a feeding mechanism that takes in the pieces of money one by one.

The dispensing section 23 is disposed on a portion of the front surface of the first unit 211 below the deposit section 22. The dispensing section 23 is configured to allow the money discharged from the inside of the first unit 211 to be accumulated therein and allow the client to take out the accumulated money.

The first money storage section 24 stores therein the money to be deposited and dispensed during the commodity settlement process. The first money storage section 24 is disposed in the first unit 211. The first money storage section 24 is disposed to be capable of being taken out to the outside of the first unit 211 via first opening 213. The first money storage section 24 comprises a plurality of denomination-based storage sections 241 that store respective different denominations of money as set in advance. Each of the denomination-based storage sections 241 is formed by a tape-type cassette in which money is wound onto a drum together with a belt-shaped tape attached to the outer circumferential surface of the drum. Note that the denomination-based storage section 241 may be configured as a stack-type storage cassette in which money is stored in a stacked manner. The denomination-based storage section 241 takes in and stores the pieces of money one by one, and feeds the pieces of stored money one by one.

The second money storage section 25 stores the money to be deposited in and dispensed from the bank account. The second money storage section 25 is disposed in the second unit 212. The second money storage section 25 is disposed to be capable of being taken out to the outside of the second unit 212 via second opening 216. The second money storage section 25 comprises a plurality of denomination-based storage sections 251 that store respective different denominations of money as set in advance. The denominations of money stored in the second money storage section 25 are set to be at least partially the same as the denominations of money stored in the first money storage section 24. With such a configuration, the money to be deposited in and dispensed from the bank account can be managed separately from the money used in the commodity settlement process. Each of the denomination-based storage section 251 has a configuration similar to that of the denomination-based storage section 241, and takes in and stores the pieces of money one by one, and feeds the pieces of stored money one by one.

The collection section 26 is disposed in the second unit 212. A collection bag is attached to the collection section 26. The collection section 26 collects, in the collection bag, the money to be collected which is not stored in the first money storage section 24 in the commodity settlement process, the proceeds from sales of the store stored in the first money storage section 24, and the like. As the money to be collected in the commodity settlement process, high-denomination money and an unfit note that do not require a withdrawal process, that is, cannot be used as change can be exemplified.

The transport section 27 comprises a combination of a roller, a belt wound around the roller, a motor for driving the roller, a side wall, and the like. The transport section 27 transports the money received from the deposit section 22 to the denomination-based storage sections 241 of the first money storage section 24, the denomination-based storage sections 251 of the second money storage section 25, or the collection section 26 under the control of the control section 31. The transport section 27 transports the money stored in the denomination-based storage sections 241 of the first money storage section 24 or the denomination-based storage sections 251 of the second money storage section 25 to the dispensing section 23 under the control of the control section 31.

The recognition section 28 is disposed on the transport section 27. The recognition section 28 recognizes the denomination and the fitness of the money deposited from the deposit section 22, and transmits a recognition result to the control section 31. The recognition section 28 can also recognize the authenticity and the like of the money. The recognition section 28 comprises sensor such as, for example, optical sensor and magnetic sensor.

The communication section 29 is controlled by the control section 31 and performs communication with the POS-side communication section 112 of the POS register 11.

The memory section 30 stores a program to be executed by the control section 31.

The control section 31 performs overall control of the money handling apparatus 20. The control section 31 performs the deposit/withdrawal process using the first money storage section 24 or the second money storage section 25 based on an instruction from the POS register 11. The control section 31 comprises, for example, a CPU (Central Processing Unit) and controls each block of the money handling apparatus 20 to implement various processes by developing and executing the program stored in the memory section 30. According to an exemplary embodiment, the control section 31 includes one or more general-purpose processing circuits, such as, for example, a microprocessor, a microcontroller, a digital signal processor, or a special-purpose processing circuit, such as an ASIC (Application Specific Integrated Circuit).

The control section 31 performs the deposit process using the first money storage section 24 based on an instruction for performing the settlement process from the POS register 11, and notifies the POS register 11 of the deposit amount. In addition, the control section 31 performs the withdrawal process for dispensing change using the first money storage section 24 based on an instruction from the POS register 11 for performing the withdrawal process.

In addition, the control section 31 performs the deposit process using the second money storage section 25 based on an instruction from the POS register 11 for performing the deposit process for deposit into the bank account, and notifies the POS register 11 of the deposit amount. The control section 31 performs the withdrawal process using the second money storage section 25 based on an instruction from the POS register 11 for performing the withdrawal process for withdrawal from the bank account.

<Operation of Money Handling System>

Next, the operation of the money handling system according to Embodiment 2 will be described.

(Settlement Process)

Figure 5:
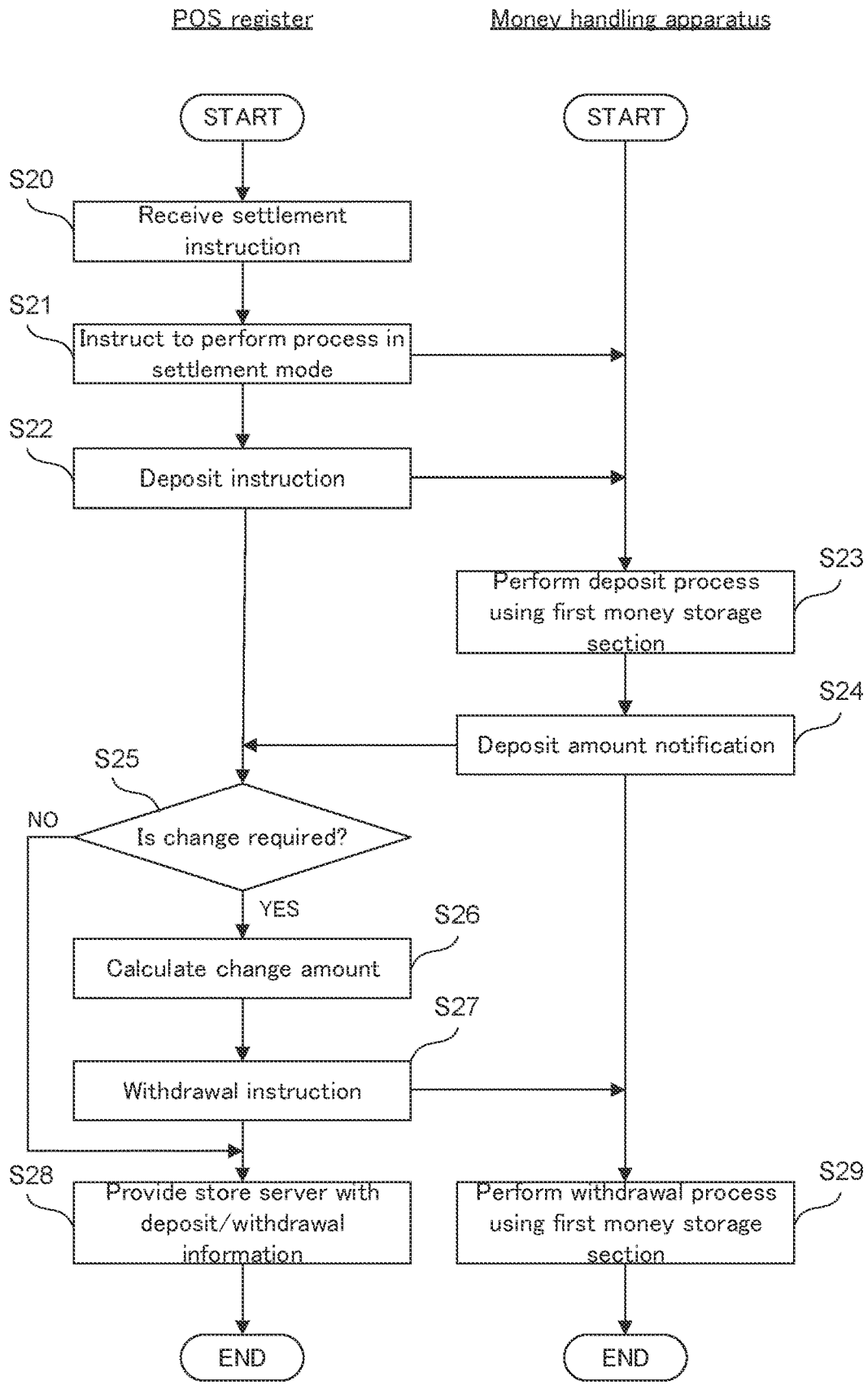
FIG. 5 is a flowchart of a settlement process according to Embodiment 2.

To begin with, the settlement process will be described. FIG. 5 is a flowchart of a settlement process according to Embodiment 2.

To begin with, a client operates the operation display section 111 of the POS register 11 to enter a commodity settlement instruction.

As illustrated in FIG. 5, the register-side control section 113 of the POS register 11 instructs the money handling apparatus 20 to perform a process in a settlement mode when a settlement instruction inputted by the client is received (step S20) (step S21). In the process of step S21, the register-side control section 113 transmits a command including only an instruction for performing the process of the settlement mode to the money handling apparatus 20.

Further, the register-side control section 113 instructs the money handling apparatus 20 to perform the deposit process (step S22). In the following description, the instruction for performing the deposit process may be referred to as a deposit instruction. In the process of step S22, the register-side control section 113 transmits a command including only the deposit instruction to the money handling apparatus 20. When the money handling apparatus 20 is configured to normally stand by in the settlement mode, the register-side control section 113 may perform only the deposit instruction of step S22. With such a configuration, the process of step S21 can be omitted.

When the control section 31 of the money handling apparatus 20 receives the instruction for performing the process in the settlement mode from the POS register 11, the control section 31 determines that the money storage section used for the process is the first money storage section 24. When receiving the deposit instruction from the POS register 11, the control section 31 determines to perform the deposit process using the first money storage section 24. When the client puts the money into the deposit section 22, the control section 31 performs the deposit process using the first money storage section 24 (step S23). In the deposit process in step S23, the transport section 27 transports, to the recognition section 28, the pieces of money taken into the housing 21 one by one by the feeding mechanism of the deposit section 22. The recognition section 28 recognizes the denomination and the fitness of the money, and transmits the recognition result to the control section 31. The control section 31 controls the denomination-based storage sections 241 and the transport section 27 such that those fit notes of money which are not to be collected are stored in the denomination-based storage section 241 of the first money storage section 24 corresponding to the denomination of money. Further, the control section 31 controls the transport section 27 such that high-denomination money among the fit notes of money which is to be collected or an unfit note are stored in the collection section 26.

Upon completion of the deposit process, the control section 31 notifies the POS register 11 of the deposit amount (step S24).

Upon receiving the notification of the deposit amount from the money handling apparatus 20, the register-side control section 113 of the POS register 11 determines whether or not change is required (step S25). When it is determined that the change is required (step S25: YES), the register-side control section 113 calculates the change amount (step S26). Then, the register-side control section 113 instructs the money handling apparatus 20 to perform the withdrawal process for dispensing the change amount of money (step S27). In the following description, the instruction for performing the withdrawal process may be referred to as a withdrawal instruction. In the process of step S27, the register-side control section 113 transmits a command including only the withdrawal instruction to the money handling apparatus 20.

Further, the register-side control section 113 provides the store server 12 with the deposit and withdrawal information on the settlement result (step S28). When the process of step S28 is performed after the processes of steps S26 and S27, the register-side control section 113 provides the store server 12 with the deposit and withdrawal information regarding the deposit amount and the withdrawal amount.

On the other hand, when it is determined that the change is not required (step S25: NO), the register-side control section 113 provides the store server 12 with the deposit and withdrawal information on the settlement result (step S28). When the process of step S28 is performed without performing the processes of steps S26 and S27, the register-side control section 113 provides the store server 12 with the deposit and withdrawal information on the withdrawal amount.

Upon acquiring the deposit and withdrawal information from the POS register 11, the store server 12 stores the content of the deposit and withdrawal information in association with the settlement date and time.

On the other hand, when receiving the withdrawal instruction from the POS register 11, the control section 31 of the money handling apparatus 20 performs the withdrawal process using the first money storage section 24 based on the withdrawal instruction and the notification of the settlement mode received in step S21 (step S29). In the withdrawal process in step S29, the control section 31 specifies the denomination-based storage section 241 in which the money to be dispensed is stored, and controls the denomination-based storage section 241 and the transport section 27 such that the money equivalent to the change is transported from the specified denomination-based storage section 241 to the dispensing section 23. The client takes out the change accumulated in the dispensing section 23. Thus, the settlement process ends.

(Deposit Process for Deposit in Bank Account)

Figure 6:
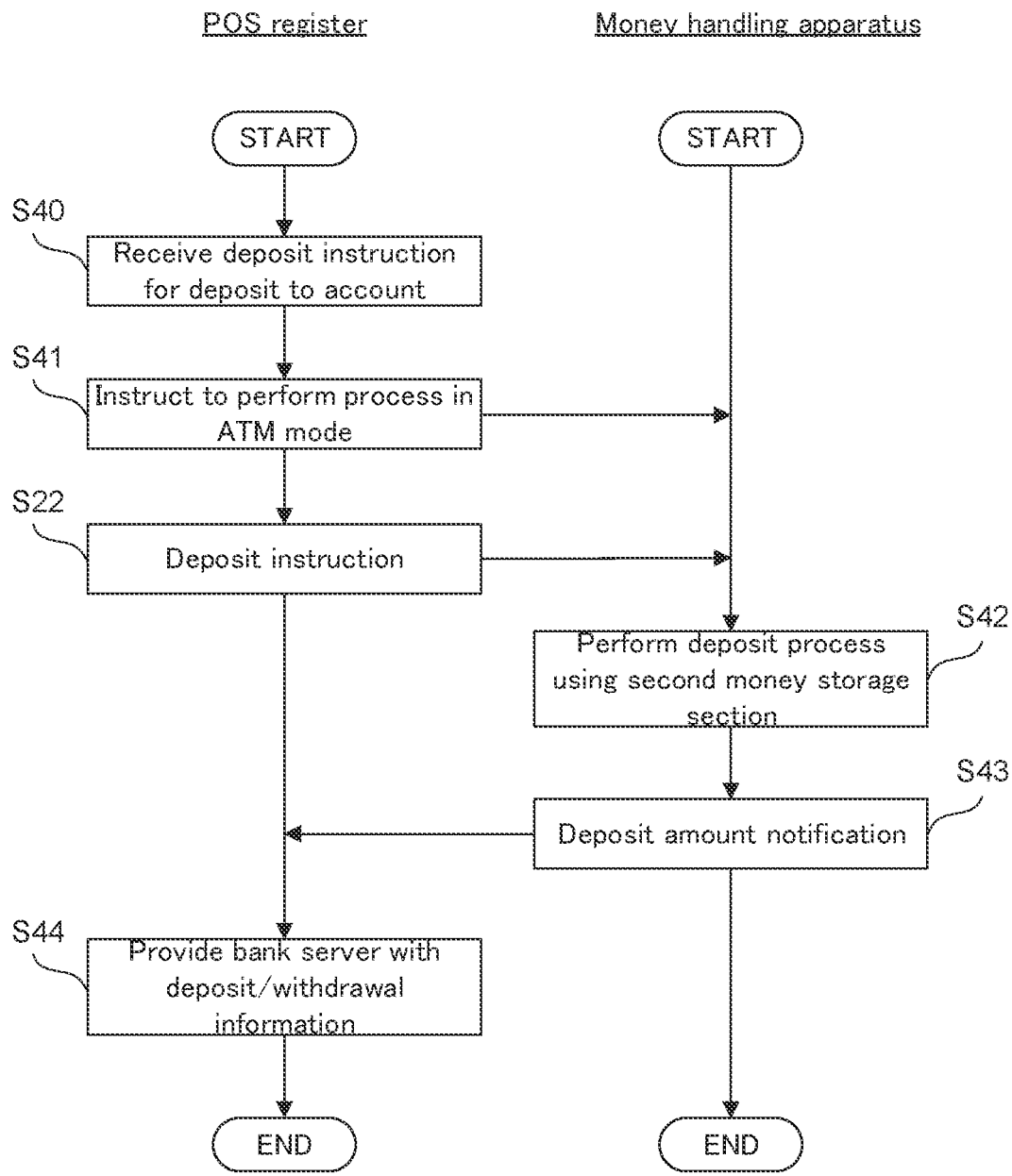
FIG. 6 is a flowchart of a deposit process for deposit in a bank account according to Embodiment 2.

Next, a deposit process for deposit into a bank account will be described. FIG. 6 is a flowchart of the deposit process for deposit to the bank account according to Embodiment 2.

To begin with, a client operates the operation display section 111 of the POS register 11 to enter a deposit instruction for deposit to the bank account. In addition, the client inserts a cash card into a card reading section of the POS register 11, for example.

As illustrated in FIG. 6, the register-side control section 113 of the POS register 11 acquires account information from the cash card, and when receiving a deposit instruction for deposit to the bank account inputted by the client (step S40), instructs the money handling apparatus 20 to perform the process in an ATM mode (step S41). In the process of step S41, the register-side control section 113 transmits a command including only the instruction for performing the process in the ATM mode to the money handling apparatus 20.

Further, the register-side control section 113 provides the money handling apparatus 20 with the deposit instruction the same as in the case where the settlement process is performed (step S22). That is, the register-side control section 113 transmits a command including only the deposit instruction to the money handling apparatus 20.

When receiving the instruction for performing the process in the ATM mode from the POS register 11, the control section 31 of the money handling apparatus 20 determines that the money storage section used for the process is the second money storage sections 25. When receiving the deposit instruction from the POS register 11, the control section 31 determines to perform the deposit process using the second money storage sections 25. When the client puts the money into the deposit section 22, the control section 31 performs the deposit process using the second money storage section 25 (step S42). In the deposit process in step S42, the money put in the deposit section 22 is transported to the recognition section 28 in the same manner as in the deposit process in step S23. The recognition section 28 recognizes the denomination of the money and transmits the recognition result to the control section 31. The control section 31 controls the denomination-based storage sections 251 and the transport section 27 so that the money is stored in the denomination-based storage section 251 of the second money storage section 25 corresponding to the denomination of the money.

Upon completion of the deposit process, the control section 31 notifies the POS register 11 of the deposit amount (step S43).

Upon receiving the notification of the deposit amount from the money handling apparatus 20, the register-side control section 113 of the POS register 11 provides the bank server 13 with the deposit amount and the deposit and withdrawal information on the account of the client (step S44).

Upon acquiring the deposit and withdrawal information from the POS register 11, the bank server 13 stores the content of the deposit and withdrawal information in association with the transaction date and time. Thus, the deposit process for deposit into the bank account ends.

(Withdrawal Process for Withdrawal from Bank Account)

Figure 7:
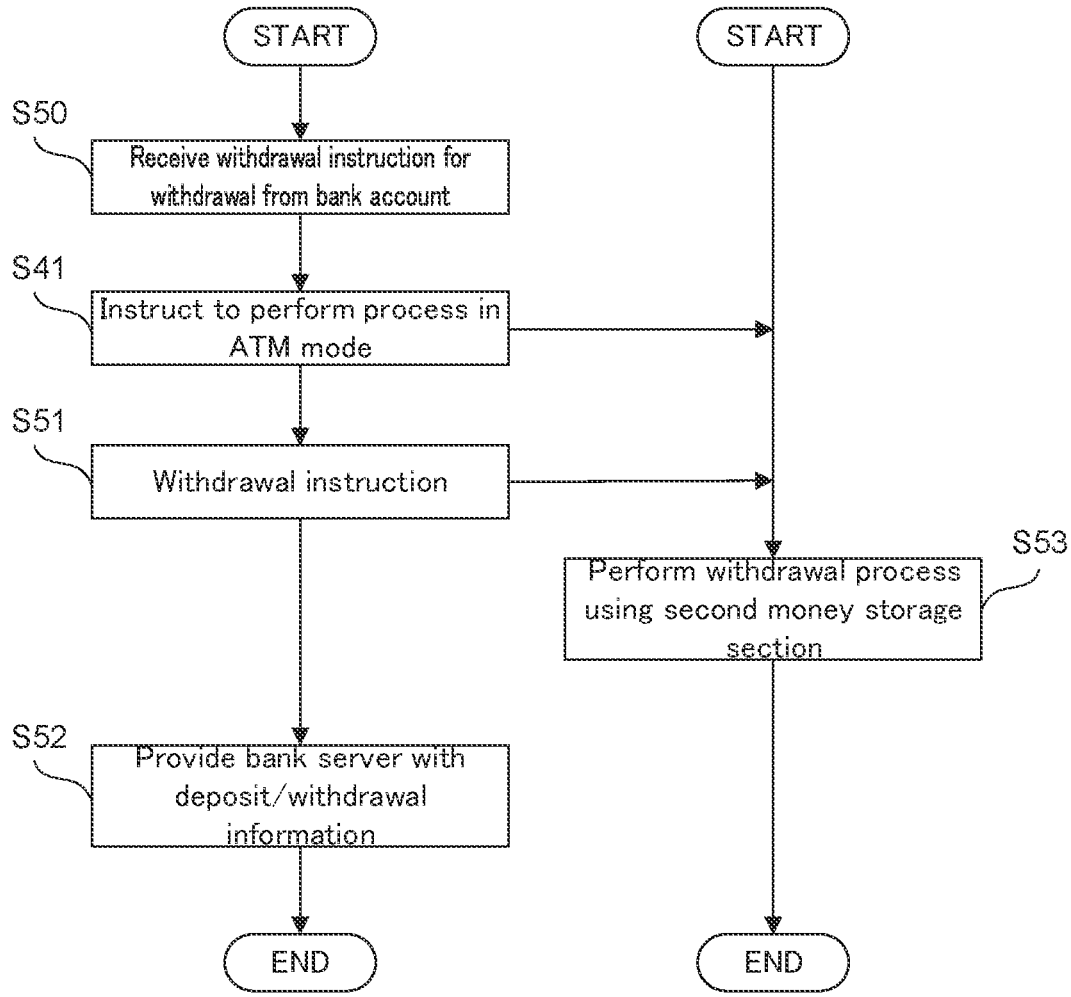
FIG. 7 is a flowchart of the withdrawal process for withdrawal from the bank account according to Embodiment 2.

Next, a withdrawal process for withdrawal from a bank account will be described. FIG. 7 is a flowchart of the withdrawal process for withdrawal from the bank account according to Embodiment 2.

To begin with, a client operates the operation display section 111 of the POS register 11 to enter a withdrawal instruction for withdrawal in a predetermined amount from the bank account, and inserts a cash card into a card reading section (not illustrated) of the POS register 11, for example.

As illustrated in FIG. 7, the register-side control section 113 of the POS register 11 acquires account information from the cash card and, and upon receiving the withdrawal instruction for withdrawal from the bank account inputted by the client (step S50), instructs the money handling apparatus 20 to perform the process in the ATM mode the same as in the case where the deposit process for deposit into the bank account is performed (step S41).

Further, the register-side control section 113 gives the money handling apparatus 20 a withdrawal instruction for dispensing money in the amount specified by the client (step S51). In the process of step S51, the register-side control section 113 transmits a command including only the withdrawal instruction to the money handling apparatus 20.

Further, the register-side control section 113 provides the bank server 13 with the withdrawal amount and the deposit and withdrawal information on the account of the client (step S52).

Upon acquiring the deposit and withdrawal information from the POS register 11, the bank server 13 stores the content of the deposit and withdrawal information in association with the transaction date and time.

On the other hand, when receiving the instruction for performing the process in the ATM mode from the POS register 11, the control section 31 of the money handling apparatus 20 determines that the money storage section used for the process is the second money storage sections 25. When receiving the withdrawal instruction from the POS register 11, the control section 31 performs the withdrawal process using the second money storage section 25 based on the withdrawal instruction and the notification of the ATM mode received in step S41 (step S53). In the withdrawal process in step S53, the control section 31 specifies the denomination-based storage section 251 in which the money to be dispensed is stored, and controls the denomination-based storage section 251 and the transport section 27 such that the money corresponding to the withdrawal amount is transported from the specified denomination-based storage section 251 to the dispensing section 23. The client takes out the money accumulated in the dispensing section 23. Thus, the withdrawal process for withdrawal from the bank account ends.

(Money Collection Process for Money Collection from Collection Section)

Next, the money collection process for money collection from the collection section 26 will be described.

A collection and delivery person operates the operation display section 111 or a terminal apparatus that the collection and delivery person has, to enter an instruction for collecting the proceeds from sales in the first money storage section 24.

Based on the instruction input by the collection and delivery person, the control section 31 of the money handling apparatus 20 controls the denomination-based storage sections 241 and the transport section 27 to collect, in the collection section 26, the proceeds from sales in the first money storage section 24. When the collection of the proceeds from sales is completed, the control section 31 causes, for example, the operation display section 111 to display an indication to that effect.

When confirming that the collection of the proceeds from sales has been completed, the collection and delivery person performs an unlocking operation of the second locking mechanism 218 of the second unit 212, and takes out the collection bag from the collection section 26. Then, when the total amount of the proceeds from sales collected in the collection bag, the high-denomination money and unfit notes not stored in the first money storage section 24 but directly collected in the collection section 26 is determined, the collection and delivery person deposits these pieces of money into the bank account of the store.

Effect of Embodiment 2

The money handling apparatus 20 comprises the first money storage section 24 that stores money used for the settlement process, and the second money storage section 25 that stores money to be deposited in and withdrawn from a bank account. Therefore, the settlement process and the deposit/withdrawal process for deposit and withdrawal in and from the bank account can be performed by the single money handling apparatus 20. It is thus possible to provide the money handling apparatus 20 with high versatility.

Embodiment 3

Next, Embodiment 3 will be described with reference to the drawings. Embodiment 3 will be described in relation to a money handling system in which, in one money handling apparatus, money stored in a second money storage section managed by a money collection and delivery company can be supplied to a first money storage section as a change fund.

<Configuration of Money Handling System>

Figure 8:
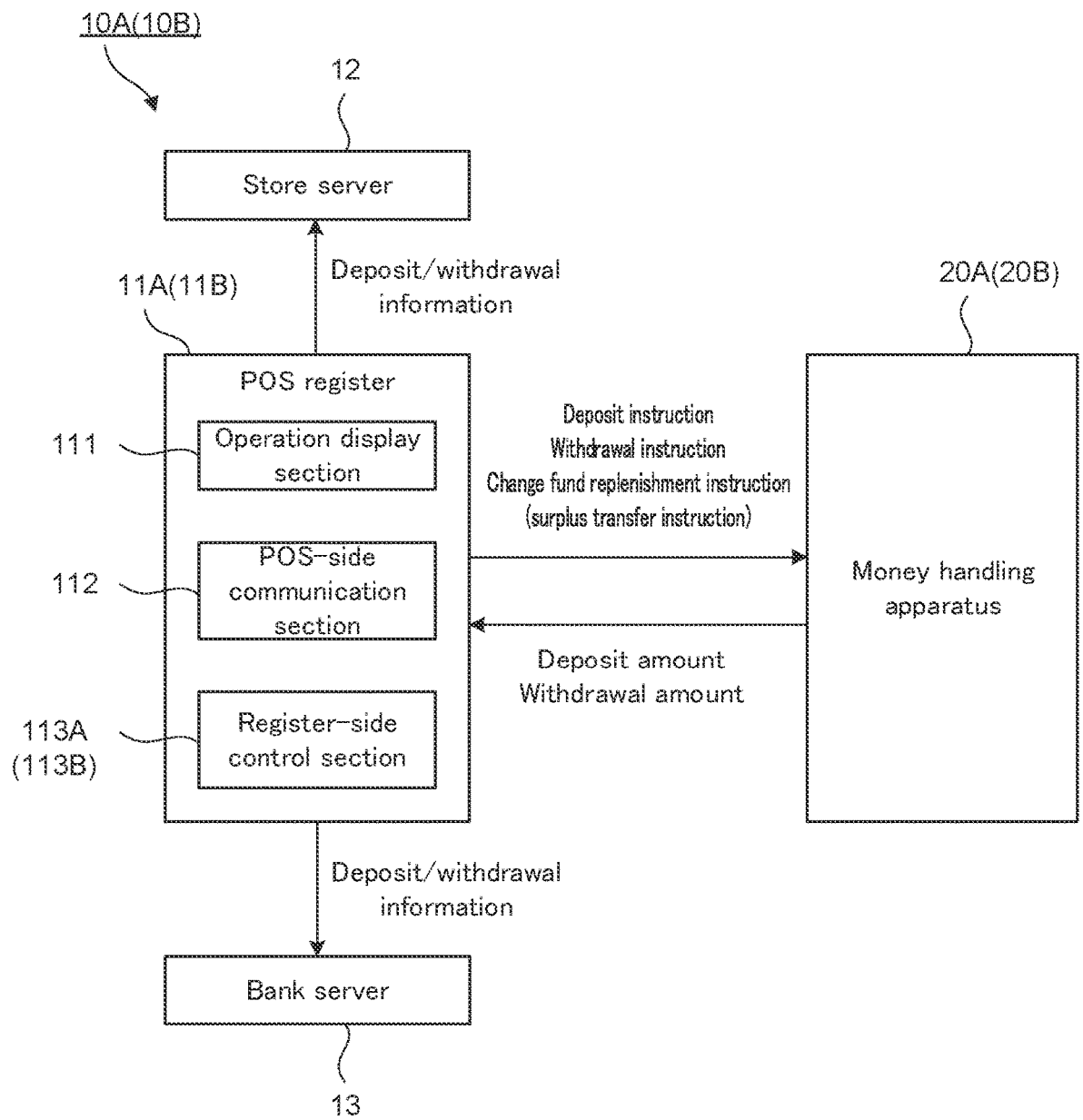
FIG. 8 is a block diagram of a money handling system according to Embodiments 3 and 4.

To begin with, a configuration of the money handling system according to Embodiment 3 will be described. FIG. 8 is a block diagram of a money handling system according to Embodiments 3 and 4. Note that the same components as those in Embodiment 2 are denoted by the same reference numerals, and description thereof will be omitted as appropriate.

A money handling system 10A illustrated in FIG. 8 comprises a money handling apparatus 20A, a POS register 11A, a store server 12, and a bank server 13. The money handling system 10A conducts a transaction relevant to a settlement process like the money handling system 10 of Embodiment 2. The money handling system 10A performs a replenishment process for replenishing the change fund in the money handling apparatus 20A.

Regarding the POS register 11A, the register-side control section 113A differs from the register-side control section 113 of Embodiment 2 in the control content, and the other configurations of the POS register 11A are the same as those of the POS register 11 of Embodiment 2. The register-side control section 113A instructs the money handling apparatus 20A to perform the settlement process or the replenishment process for replenishing the change fund.

When performing the settlement process, the register-side control section 113A performs the deposit instruction and the withdrawal instruction for dispensing the change as needed substantially the same as those performed by the register-side control section 113 of Embodiment 2, and provides the store server 12 with the deposit and withdrawal information on the settlement result.

In addition, the register-side control section 113A instructs the money handling apparatus 20A to perform the replenishment process for replenishing the change fund of a predetermined money, and also provides the bank server 13 with the replenishment amount for the change fund and the deposit and withdrawal information on the account of the store.

Next, a detailed configuration of the money handling apparatus according to Embodiment 3 will be described with reference to FIG. 4. In the money handling apparatus 20A of Embodiment 3 illustrated in FIG. 4, the roles of the second money storage section 25A and the control content of the control section 31A are different from those of the second money storage section 25 and that of the control section 31 of Embodiment 2, respectively, and the other configurations are the same as those of the money handling apparatus 20 of Embodiment 2.

The second money storage section 25A stores money replenishing the first money storage section 24 as a change fund. The denominations of money stored in the second money storage section 25A are set such that all the denominations are the same as the denominations of money stored in the first money storage section 24. With such a configuration, it is possible to add the change of the denominations stored in the first money storage section 24.

The control section 31A performs the deposit/withdrawal process using the first money storage section 24 or a change fund replenishment process based on an instruction from the POS register 11A. The change fund replenishment process is an exemplary money transport process between the first money storage section 24 and the second money storage section 25A.

The control section 31A performs the deposit process using the first money storage section 24, notification of the deposit amount to the POS register 11A, and the withdrawal process using the first money storage section 24, substantially in the same manner as the control section 31, based on an instruction for performing the settlement process from the POS register 11A.

Further, the control section 31 transports the money for replenishment, which is stored in the second money storage section 25A, to the first money storage section 24 based on an instruction from the POS register 11A to perform the change fund replenishment process.

<Operation of Money Handling System>

Next, the operation of the money handling system according to Embodiment 3 will be described.

(Settlement Process)

To begin with, the settlement process will be described. The settlement process performed in the money handling system 10A of Embodiment 3 is the same as Embodiment 2 except that the process of step S21 in FIG. 5 is not performed and the processes of step S22 and step S27 differ between the embodiments. Specifically, when receiving the settlement instruction inputted by the client in step S20, the register-side control section 113A of the POS register 11A does not perform the process of step S21 and instructs the money handling apparatus 20 to perform the deposit process in the settlement mode in step S22. Thereafter, the money handling system 10A performs the processes of steps S23 to S29. The register-side control section 113A instructs the money handling apparatus 20 to perform the withdrawal process in the settlement mode when performing the process of step S27.

(Change Fund Replenishment Process)

Figure 9:
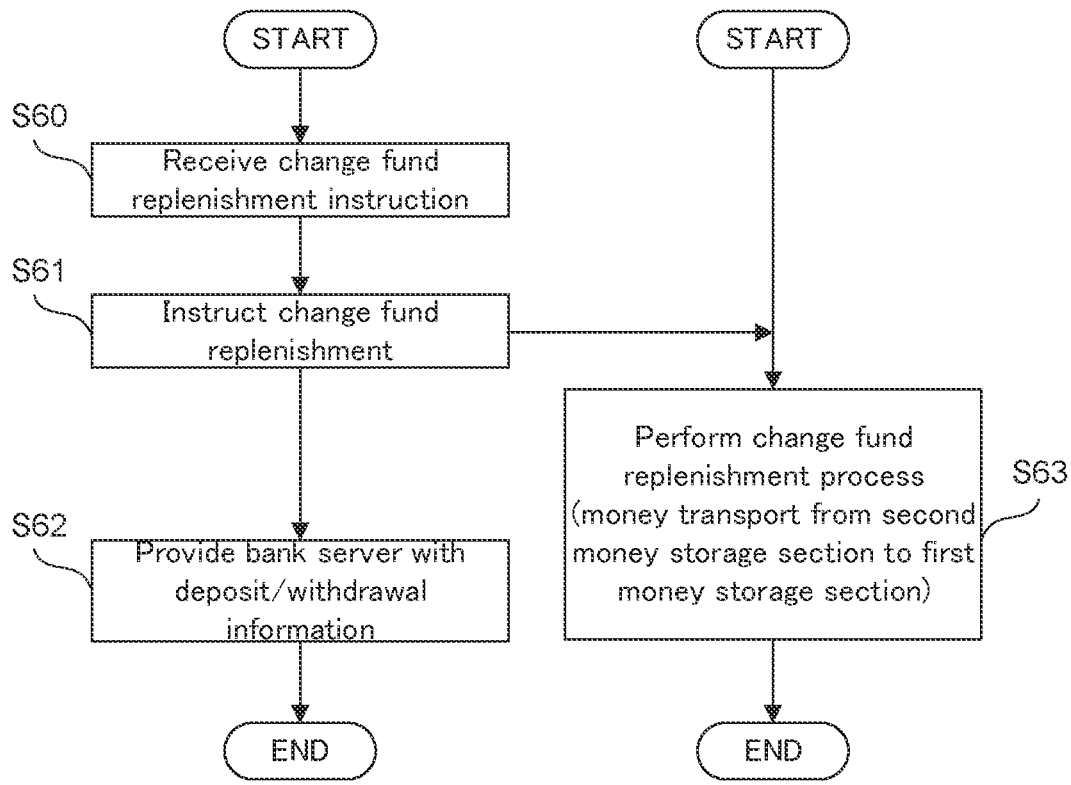
FIG. 9 is a flowchart of a replenishment process for replenishment of a change fund according to Embodiments 3 and 4.

The change fund replenishment process will be described. FIG. 9 is a flowchart of a change fund replenishment process according to Embodiments 3 and 4.

To begin with, a store clerk who is a user of the money handling apparatus 20A operates the operation display section 111 to enter a change fund replenishment instruction for replenishing a change fund in a predetermined amount and of a predetermined denomination. When the store clerk performs the change fund replenishment instruction, the instruction may be made on the same menu screen as the settlement instruction, or by launching another menu screen or another application that is different from that for the settlement instruction and that can be operated by performing authentication. Further, the replenishment instruction may be made by using a terminal apparatus that the store clerk has. The store clerk may cause the operation display section 111 to display a money storage status of the money handling apparatus 20A managed by the store server 12 and may determine the timing for the change fund replenishment instruction based on the displayed money storage status.

As illustrated in FIG. 9, upon receiving the change fund replenishment instruction input by the store clerk (step S60), the register-side control section 113A of the POS register 11A gives the change fund replenishment instruction as input by the store clerk to the money handling apparatus 20A (step S61). Further, the register-side control section 113A provides the bank server 13 with the replenishment amount of the change fund and the deposit and withdrawal information on the account of the store (step S62).

Upon acquiring the deposit and withdrawal information from the POS register 11A, the bank server 13 stores the replenishment amount of the change fund, the store account number, and the transaction date and time in association with one another.

On the other hand, when receiving the change fund replenishment instruction from the POS register 11A, the control section 31A of the money handling apparatus 20A specifies the denomination-based storage section 251 of the second money storage section 25A in which the replenishment money is stored. Then, the control section 31A controls the denomination-based storage sections 241 and 251 and the transport section 27 such that the money equivalent to the replenishment amount is transported from the specified denomination-based storage section 251 to the denomination-based storage section 241 of the first money storage section 24 that stores the money (step S63). Thus, the change fund replenishment process ends.

Also without the instruction from the store clerk, the register-side control section 113A of the POS register 11A may instruct the money handling apparatus 20A to replenish the change fund based on data relevant to the money storage status of the money handling apparatus 20A managed by the store server 12. In addition, without the denomination and the amount of the money for replenishing the change fund being specified by the store clerk, the denomination and the amount of the money for replenishment by the register-side control section 113A may be determined based on the data relevant to the money storage status of the money handling apparatus 20A managed by the store server 12.

In the change fund replenishment process illustrated in FIG. 9, the register-side control section 113A or the control section of the terminal apparatus of the store clerk may give the money handling apparatus 20A an instruction for moving the money from the second money storage section 25A to the first money storage section 24 instead of the change fund replenishment instruction in step S61. In this case, based on the fact that the instruction from the store clerk in step S60 is the change fund replenishment instruction, the register-side control section 113A or the control section of the terminal apparatus of the store clerk determines to move the money from the second money storage section 25A to the first money storage section 24.

Effect of Embodiment 3

The money handling apparatus 20A comprises the first money storage section 24 that stores money used for the settlement process, and the second money storage section 25A that stores money for replenishing a change fund. Therefore, without calling the collection and delivery person, the store clerk can replenish the first money storage section 24 with the change fund from the second money storage section 25A in the second unit 212 which can be opened only by the collection and delivery person.

The money handling apparatus 20A provides the bank server 13 with the deposit and withdrawal information on the change fund replenishment process. The bank server 13 subtracts the replenishment amount from the balance of the bank account of the store based on the deposit and withdrawal information from the money handling apparatus 20A. Therefore, the store can easily manage the bank account without going to the bank.

Embodiment 4

Next, Embodiment 4 will be described with reference to the drawings. Embodiment 4 is described in relation to a money handling system in which, in one money handling apparatus, a change fund in the first money storage section can be replenished as in Embodiment 3, while a surplus of the change fund stored in the first money storage section can be transferred to the second money storage section managed by the money collection and delivery company. The surplus means money in an amount corresponding to exceedance by which the money stored in the first money storage section is greater than a predetermined amount.

<Configuration of Money Handling System>

To begin with, a configuration of the money handling system according to Embodiment 4 will be described with reference to FIG. 8. The same components as those in Embodiment 3 are denoted by the same reference numerals, and the description thereof will be omitted as appropriate.

The money handling system 10B illustrated in FIG. 8 comprises a money handling apparatus 20B, a POS register 11B, a store server 12, and a bank server 13. The money handling system 10B conducts a transaction relevant to a settlement process similar to that in the money handling system 10B of Embodiment 3. In addition, the money handling system 10B performs a change fund replenishment process similar to that in the money handling system 10B of Embodiment 3 and a surplus transfer process in the money handling apparatus 20A.

In the POS register 11B, the control content of the register-side control section 113B is different from that of the register-side control section 113A of Embodiment 3, and other configurations are the same as those of the POS register 11A of Embodiment 3. The register-side control section 113B instructs the money handling apparatus 20B to perform the settlement process, the change fund replenishment process, or the surplus transfer process.

When performing the settlement process, the register-side control section 113B like the register-side control section 113 of Embodiment 3 performs the deposit instruction and the withdrawal instruction for dispensing change as needed, and provides the store server 12 with the deposit and withdrawal information on the settlement result. When performing the change fund replenishment process, the register-side control section 113B like register-side control section 113A of Embodiment 3 performs the change fund replenishment instruction, and also provides the store server 12 with the replenishment amount and the deposit and withdrawal information on the account of the store.

When the surplus transfer process is performed, the register-side control section 113B instructs the money handling apparatus 20B to perform the transfer process of transferring certain money, and also provides the bank server 13 with the surplus transfer amount and the deposit and withdrawal information on the account of the store.

Next, a detailed configuration of the money handling apparatus according to Embodiment 4 will be described with reference to FIG. 4. In the money handling apparatus 20B of Embodiment 4 illustrated in FIG. 4, the roles of the second money storage section 25B and the control content of the control section 31B are different from those of the second money storage section 25A and that of the control section 31A of Embodiment 3, respectively, and the other configurations are the same as those of the money handling apparatus 20A of Embodiment 3.

The second money storage section 25B stores money for replenishing a change fund in the first money storage section 24, like the second money storage section 25A of Embodiment 3. Further, the second money storage section 25B stores money transferred from the first money storage section 24 as surplus. The denominations of money stored in the second money storage section 25B are set to be the same as the denominations of money stored in the first money storage section 24. With such a configuration, the surplus of the denominations of money stored in the first money storage section 24 can be transferred.

Based on an instruction from the POS register 11B, the control section 31B performs the deposit/withdrawal process, the change fund replenishment process, or the surplus transfer process performed using the first money storage section 24. The change fund replenishment process and the surplus transfer process are examples of the money transport process between the first money storage section 24 and the second money storage section 25B.

The control section 31B performs the deposit process using the first money storage section 24, notification of the deposit amount to the POS register 11B, and the withdrawal process using the first money storage section 24, in the same manner as the control section 31A of Embodiment 3, based on an instruction for performing the settlement process from the POS register 11B. In addition, the control section 31B transports the replenishment money stored in the second money storage section 25B to the first money storage section 24, like the control section 31A of Embodiment 3, based on an instruction from the POS register 11B to perform the change fund replenishment process.

Further, the control section 31B transports the money to be transferred, which is stored in the first money storage section 24, to the second money storage section 25B based on an instruction for performing the surplus transfer process from the POS register 11B.

<Operation of Money Handling System>

Next, the operation of the money handling system according to Embodiment 4 will be described. Note that the settlement process and the change fund replenishment process performed by the money handling system are the same as those in Embodiment 3, and thus the description thereof is omitted.

(Surplus Transfer Process)

Figure 10:
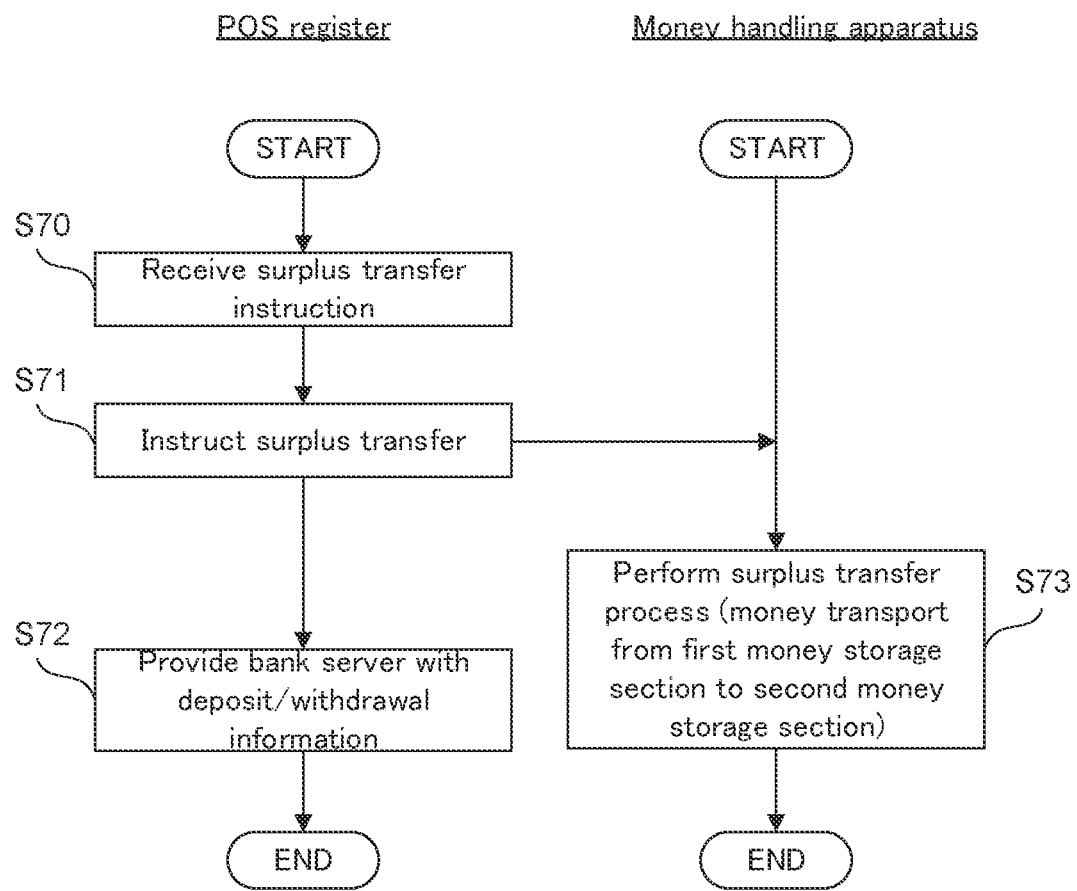
FIG. 10 is a flowchart of a surplus transfer process according to Embodiment 4.

The surplus transfer process will be described. FIG. 10 is a flowchart of the surplus transfer process according to Embodiment 4.

To begin with, a store clerk who is a user of the money handling apparatus 20 B operates the operation display section 111 to enter a surplus transfer instruction for transferring a surplus of an amount of money of a certain denomination. When the store clerk gives a surplus transfer instruction, the instruction may be made on the same menu screen as the settlement instruction or the change fund replenishment instruction, or by launching another menu screen or another application that is different from that for the settlement instruction and that can be operated by performing authentication. Alternatively, the transfer instruction may be given by using a terminal apparatus that the store clerk has. The timing at which the store clerk gives the surplus transfer instruction may be exemplified by a timing at which the surplus is confirmed by using the operation display section 111 and/or a predetermined time, but is not limited thereto.

As illustrated in FIG. 10, upon receiving the surplus transfer instruction input by the store clerk (step S70), the register-side control section 113B of the POS register 11B gives the surplus transfer instruction input by the store clerk to the money handling apparatus 20B (step S71). Further, the register-side control section 113B provides the bank server 13 with a surplus transfer amount and the deposit and withdrawal information on the account of the store (step S72).

Upon acquiring the deposit and withdrawal information from the POS register 11B, the bank server 13 stores the surplus transfer amount, the store account number, and the transaction date and time in association with one another.

On the other hand, when the surplus transfer instruction from the POS register 11B is received, the control section 31B of the money handling apparatus 20B specifies the denomination-based storage section 241 of the first money storage section 24 in which the money to be transferred is stored. Then, the control section 31B controls the denomination-based storage sections 241 and 251 and the transport section 27 such that the money equivalent to the transfer amount is transported from the specified denomination-based storage section 241 to the denomination-based storage section 251 of the second money storage section 25B that stores the money (step S73). Thus, the surplus transfer process ends.

Also without the instruction from the store clerk, the register-side control section 113B of the POS register 11B may instruct the money handling apparatus 20B to transfer the surplus based on data relevant to the money storage status of the money handling apparatus 20B managed by the store server 12. In addition, without the denomination and the amount of the money to be transferred as the surplus being specified by the store clerk, the denomination and the amount of the money to be transferred by the register-side control section 113B may be determined based on the data relevant to the money storage status of the money handling apparatus 20B managed by the store server 12.

In addition, the register-side control section 113B or the control section of the terminal apparatus of the store clerk may give the money handling apparatus 20B an instruction for moving the money from the first money storage section 24 to the second money storage section 25B instead of the surplus transfer instruction in step S71. In this case, based on the fact that the instruction from the store clerk in step S70 is the surplus transfer instruction, the register-side control section 113B or the control section of the terminal apparatus of the store clerk determines to move the money from the first money storage section 24 to the second money storage section 25B.

Effect of Embodiment 4

According to Embodiment 4, the following effects are obtained in addition to the same effects as those of Embodiment 3. The money handling apparatus 20B comprises the first money storage section 24 that stores money used for the settlement process, and the second money storage section 25B that receives a surplus. Therefore, without calling the collection and delivery person, the store clerk can transfer the surplus of the change fund to the second money storage section 25B in the second unit 212 which can be opened only by the collection and delivery person.

The money handling apparatus 20B provides the bank server 13 with the deposit and withdrawal information on the surplus transfer process. The bank server 13 adds the transfer amount of money to the balance of the bank account of the store based on the deposit and withdrawal information from the money handling apparatus 20B. Therefore, the store can easily manage the bank account without going to the bank.

Embodiment 5

Next, Embodiment 5 will be described with reference to the drawings. Embodiment 5 is described in relation to a money handling system in which, in one money handling apparatus, deposit for payment and dispensing of change in the first currency, and, dispensing of change in the first currency with respect to deposit of payment in the second currency can be performed.

<Configuration of Money Handling System>

Figure 11:
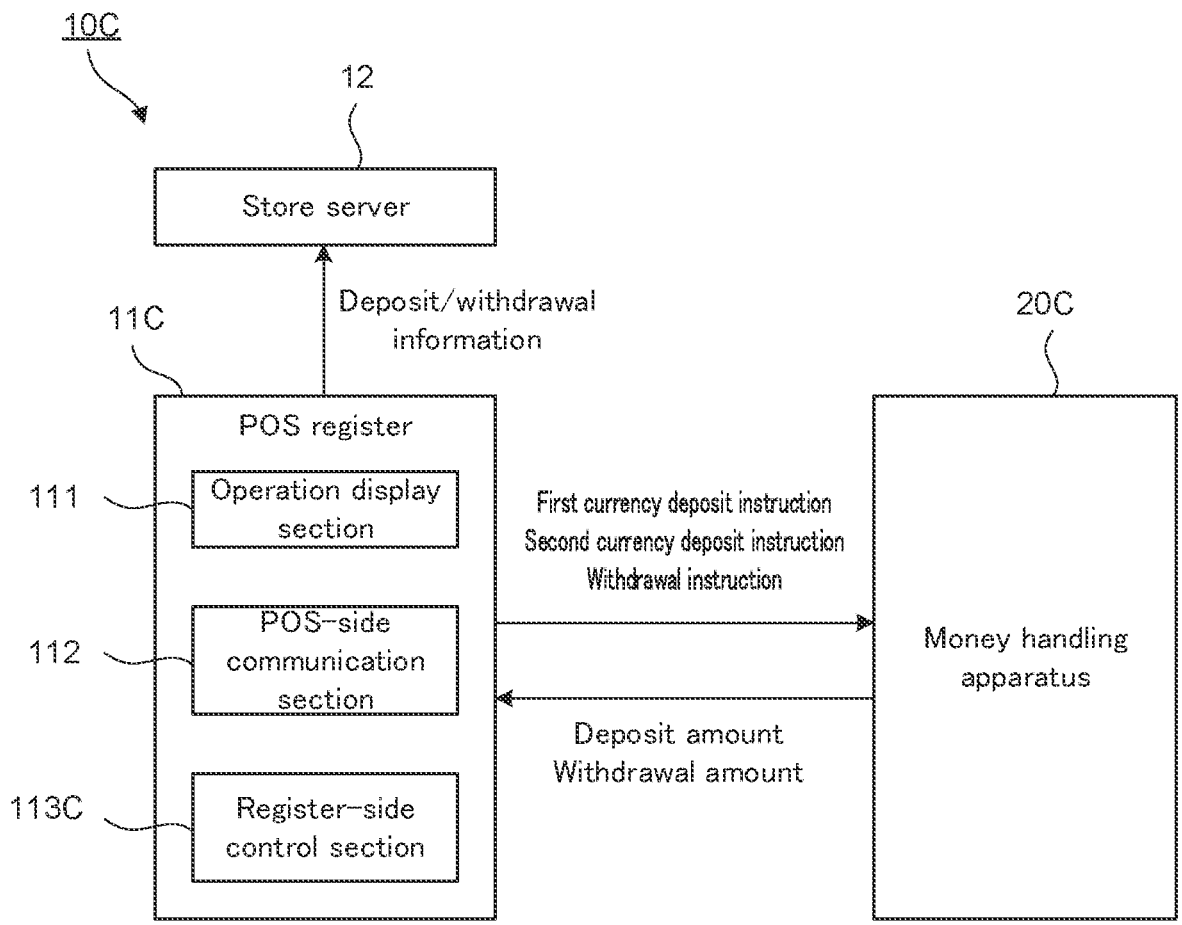
FIG. 11 is a schematic diagram of a money handling system according to Embodiment 5.

To begin with, a configuration of the money handling system according to Embodiment 5 will be described. FIG. 11 is a schematic diagram of the money handling system according to Embodiment 5. The same components as those in Embodiment 4 are denoted by the same reference numerals, and the description thereof will be omitted as appropriate.

The money handling system 10C illustrated in FIG. 11 comprises a money handling apparatus 20C, a POS register 11C, and the store server 12. The money handling system 10C conducts a transaction relevant to a settlement process using the first currency and the second currency.

In the POS register 11C, the control content of the register-side control section 113C is different from that of the register-side control section 113B of Embodiment 4, and other configurations are the same as those of the POS register 11B of Embodiment 4. The register-side control section 113C instructs the money handling apparatus 20C to perform the settlement process using the first currency or the settlement process using the first currency and the second currency.

The register-side control section 113C instructs the money handling apparatus 20C to perform the settlement process using the first currency, and when the deposit amount of the first currency is notified by the money handling apparatus 20C in response to the instruction, calculates change in the first currency. Then, the register-side control section 113C instructs the money handling apparatus 20C to perform the withdrawal process for dispensing the change in the first currency, while providing the store server 12 with the deposit and withdrawal information on the settlement result.

Further, the register-side control section 113C instructs the money handling apparatus 20C to perform the settlement process using the first currency and the second currency, and when the deposit amount of the second currency is notified by the money handling apparatus 20C in response to the instruction, the register-side control section calculates change in the first currency based on the exchange rate between the second currency and the first currency. Then, the register-side control section 113C instructs the money handling apparatus 20C to perform the withdrawal process for dispensing the change in the first currency, while providing the store server 12 with the deposit and withdrawal information on the settlement result.

Next, a detailed configuration of the money handling apparatus according to Embodiment 5 will be described with reference to FIG. 4. In the money handling apparatus 20C of Embodiment 5 illustrated in FIG. 4, the kind of the currency stored in each of the first money storage section 24C and the second money storage section 25C and the control content of the control section 31C are different from the kind of the currency stored in each of the first money storage section 24 and the second money storage section 25B, and the control content of the control section 31B of Embodiment 4, respectively, and the other configurations are the same as those of the money handling apparatus 20B of Embodiment 4.

The first money storage section 24C stores the first currency to be deposited and dispensed at the time of the commodity settlement process. The plurality of denomination-based storage sections 241 of the first money storage section 24C store respective different denominations of the first currency set in advance.

The second money storage section 25C stores the second currency to be deposited during the commodity settlement process. The plurality of denomination-based storage sections 251 of the second money storage section 25C store respective different denominations of the second currency set in advance.

The control section 31C performs, based on an instruction from the POS register 11C, the deposit/withdrawal process using the first money storage section 24C, or, the withdrawal process using the first money storage section 24C for change dispensing in response to the deposit process using the second money storage section 25C.

Based on the instruction from the POS register 11C for performing the settlement process using the first currency, the control section 31C performs the deposit process in the first currency using the first money storage section 24C, and notifies the POS register 11C of the deposit amount in the first currency. Then, the control section 31C performs the withdrawal process for dispensing the change in the first currency using the first money storage section 24C based on the instruction from the POS register 11C to perform the withdrawal process for dispensing the change in the first currency.

Further, based on the instruction from the POS register 11C for performing the settlement process using the first currency and the second currency, the control section 31C performs the deposit process in the second currency using the second money storage section 25C, and notifies the POS register 11C of the deposit amount in the second currency. Then, the control section 31C performs the withdrawal process for dispensing the change in the first currency using the first money storage section 24C based on the instruction from the POS register 11C to perform the withdrawal process for dispensing the change in the first currency.

In addition, the control section 31C transports a part of the first currency to the collection section 26 at the time of the deposit/withdrawal process using the first money storage section 24C, and transports the second currency stored in the second money storage section 25C to the collection section 26 in response to an operation instruction from the collection and delivery person outside operating hours.

<Operation of Money Handling System>

Next, the operation of the money handling system according to Embodiment 5 will be described.

(Settlement Process Accompanied by Payment in First Currency)

Figure 12:
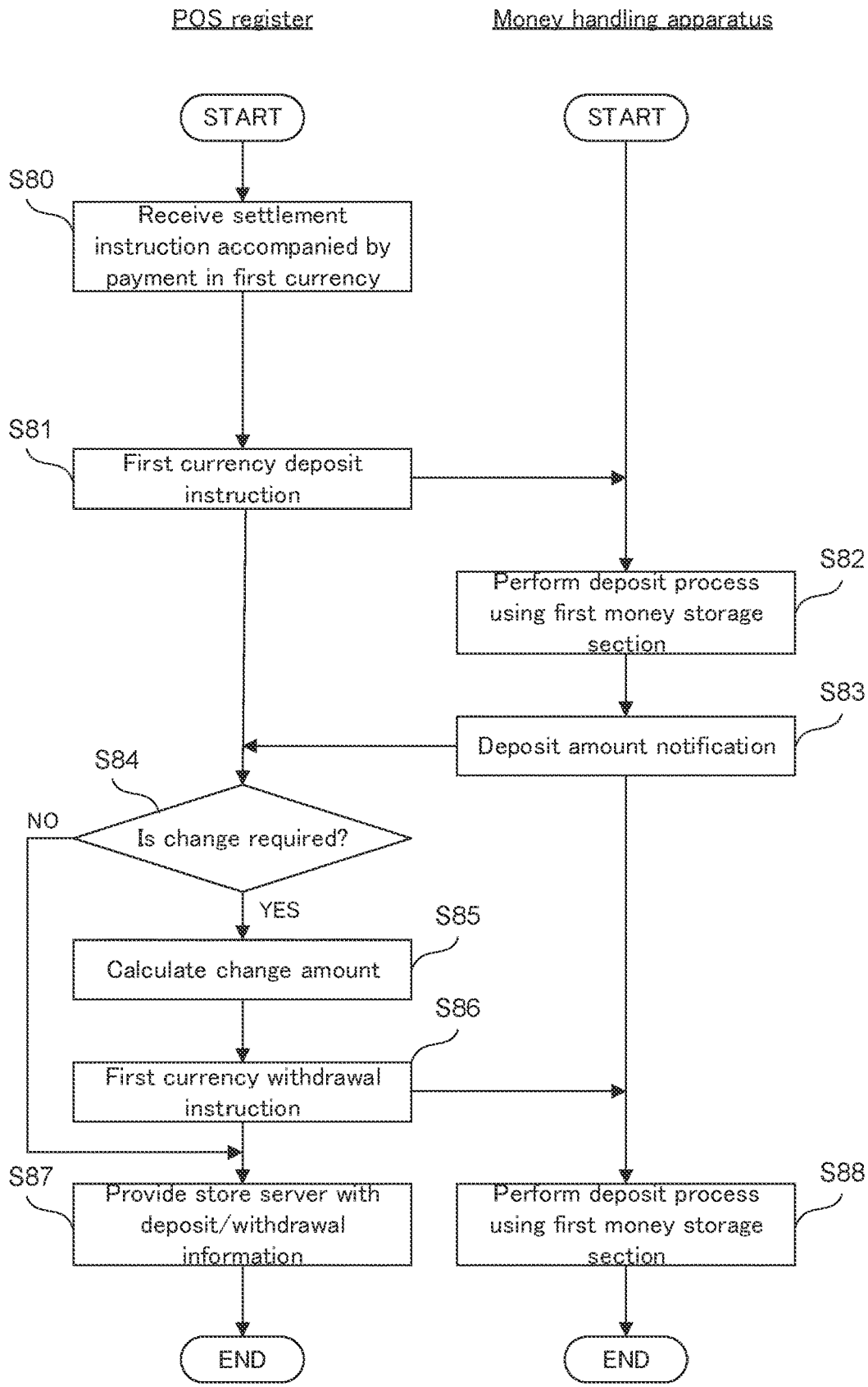
FIG. 12 is a flowchart of a settlement process accompanied by payment in first currency according to Embodiment 5.

To begin with, a settlement process accompanied by payment in the first currency will be described. FIG. 12 is a flowchart of the settlement process accompanied by payment in the first currency according to Embodiment 5.

To begin with, a client operates the operation display section 111 of the POS register 11C to enter a settlement instruction accompanied by the payment in the first currency.

As illustrated in FIG. 12, when receiving the settlement instruction accompanied by the payment in the first currency (step S80), the register-side control section 113C of the POS register 11C instructs the money handling apparatus 20C to perform the deposit process for deposit in the first currency (step S81).

When receiving the deposit instruction for deposit in the first currency from the POS register 11C, the control section 31C of the money handling apparatus 20C determines that the money storage section used for the deposit process is the first money storage section 24C. When the client puts the first currency into the deposit section 22, the control section 31C performs the deposit process using the first money storage section 24C (step S82). In the deposit process in step S82, the first currency put in the deposit section 22 is transported to the recognition section 28 in the same manner as in the deposit process in step S23 of Embodiment 3. The recognition section 28 recognizes the denomination of the first currency and transmits the recognition result to the control section 31C. The control section 31C controls the denomination-based storage sections 241 and the transport section 27 such that the first currency is stored in the denomination-based storage section 241 of the first money storage section 24C corresponding to the denomination of the currency. Further, the control section 31C controls the transport section 27 such that those of the fit notes in the first currency which are to be collected and an unfit note are stored in the collection section 26. The first currency to be collected is exemplified by high-denomination money that does not require a withdrawal process, that is, cannot be used as change.

When the deposit process for deposit in the first currency is completed, the control section 31C notifies the POS register 11C of the deposit amount in the first currency (step S83).

Upon receiving the notification of the deposit amount from the money handling apparatus 20C, the register-side control section 113C of the POS register 11C determines whether or not change is required (step S84). When determining that the change is required (step S84: YES), the register-side control section 113C calculates the change amount in the first currency (step S85). Then, the register-side control section 113C instructs the money handling apparatus 20C to perform the withdrawal process for dispensing change in the change amount in the first currency (step S86). Further, the register-side control section 113C provides the store server 12 with the deposit and withdrawal information on the settlement result (step S87). When the process of step S87 is performed after the processes of steps S85 and S86, the register-side control section 113C provides the store server 12 with the deposit and withdrawal information regarding the deposit amount and the withdrawal amount.

On the other hand, when determining that the change is not required (step S84: NO), the register-side control section 113C provides the store server 12 with the deposit and withdrawal information on the settlement result (step S87). When the process of step S87 is performed without performing the processes of steps S85 and S86, the register-side control section 113C provides the store server 12 with the deposit and withdrawal information regarding the withdrawal amount.

Upon acquiring the deposit and withdrawal information from the POS register 11C, the store server 12 stores the content of the deposit and withdrawal information in association with the settlement date and time.

On the other hand, when receiving the withdrawal instruction from the POS register 11C, the control section 31C of the money handling apparatus 20C performs the withdrawal process for dispensing in the first currency using the first money storage section 24C (step S88). In the withdrawal process in step S88, the control section 31C specifies the denomination-based storage section 241 of the first money storage section 24C in which the first currency to be dispensed is stored, and controls the denomination-based storage section 241 and the transport section 27 such that an amount of the first currency equivalent to the change is transported from the specified denomination-based storage section 241 to the dispensing section 23. The client takes out the change in the first currency accumulated in the dispensing section 23. Thus, the settlement process accompanied by the payment in the first currency ends.

(Settlement Process Accompanied by Payment in Second Currency)

Figure 13:
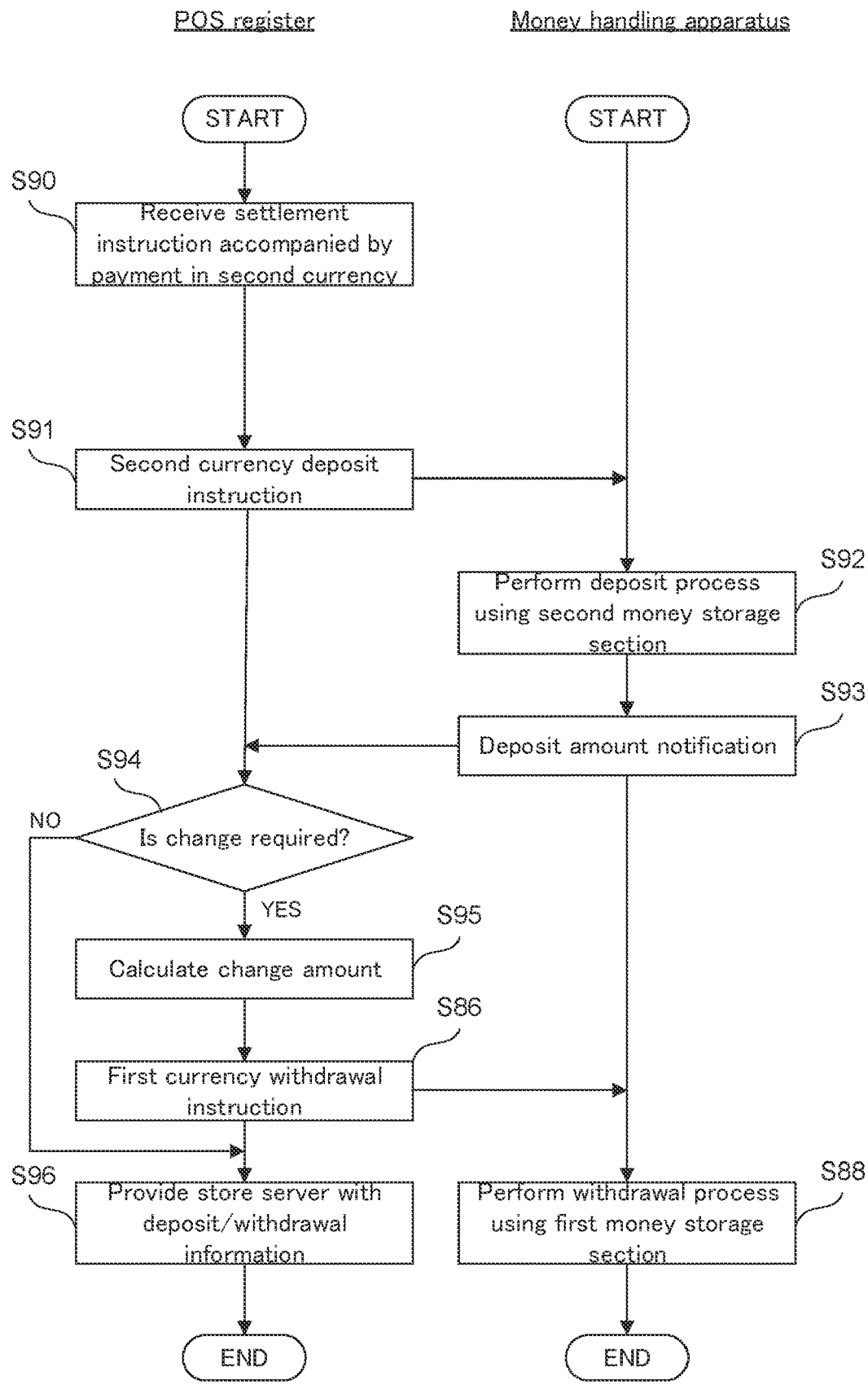
FIG. 13 is a flowchart of a settlement process accompanied by payment in a second currency according to Embodiment 5.

Next, the settlement process accompanied by the payment of the second currency will be described. FIG. 13 is a flowchart of the settlement process accompanied by payment of the second currency according to Embodiment 5.

To begin with, a client operates the operation display section 111 of the POS register 11C to enter a settlement instruction accompanied by the payment in the second currency.

As illustrated in FIG. 13, when receiving the settlement instruction accompanied by the payment of the second currency (step S90), the register-side control section 113C of the POS register 11C instructs the money handling apparatus 20C to perform the deposit process for deposit in the second currency (step S91).

When receiving the deposit instruction for deposit in the second currency from the POS register 11C, the control section 31C of the money handling apparatus 20C determines that the money storage section used for the deposit process is the second money storage section 25C. When the client puts the second currency into the deposit section 22, the control section 31C performs the deposit process using the second money storage section 25C (step S92). In the deposit process in step S92, the second currency put into the deposit section 22 is stored in the denomination-based storage section 251 of the second money storage section 25C corresponding to the denomination of the second currency by the same process as the deposit process for deposit in the first currency in step S82. Note that, since the second currency is not to be dispensed as change, the control section 31C does not store the second currency in the collection section 26 even when the second currency is high-denomination money, an unfit note, or the like.

When the deposit process for deposit in the second currency is completed, the control section 31C notifies the POS register 11C of the deposit amount in the second currency (step S93).

Upon receiving the notification of the deposit amount from the money handling apparatus 20C, the register-side control section 113C of the POS register 11C determines whether or not change is required (step S94). When determining that the change is required (step S94: YES), the register-side control section 113C calculates the change amount not in the second currency but in the first currency (step S95), and instructs the money handling apparatus 20C to perform the withdrawal process for dispensing the change in the change amount in the first currency (step S86). Further, the register-side control section 113C provides the store server 12 with the deposit and withdrawal information on the settlement result (step S96). When the process of step S96 is performed after the processes of steps S95 and S86, the register-side control section 113C provides the store server 12 with the deposit and withdrawal information regarding the deposit amount and the withdrawal amount.

On the other hand, when determining that the change is not required (step S94: NO), the register-side control section 113C provides the store server 12 with the deposit and withdrawal information on the settlement result (step S96). When the process of step S96 is performed without performing the processes of steps S95 and S86, the register-side control section 113C provides the store server 12 with the deposit and withdrawal information regarding the withdrawal amount.

Upon acquiring the deposit and withdrawal information from the POS register 11C, the store server 12 stores the content of the deposit and withdrawal information in association with the settlement date and time.

On the other hand, when receiving the withdrawal instruction from the POS register 11C, the control section 31C of the money handling apparatus 20C performs the withdrawal process for dispensing in the first currency using the first money storage section 24C (step S88). The client takes out the change of the first money accumulated in the dispensing section 23. Thus, the settlement process accompanied by the payment in the second currency ends.

In the processes illustrated in FIGS. 12 and 13, the register-side control section 113C may include, in the deposit instruction in step S81 or step S91 and the withdrawal instruction in step S86, information on the money storage section used for deposit or dispensing, instead of the kind of currency. In such cases, the register-side control section 113C determines which of the first money storage section 24C and the second money storage section 25C is to be used based on the kind of currency of deposited money or the kind of currency of dispensed money.

(Collection Process for Collecting First Currency and Second Currency)

Next, a collection process for collecting the first currency and the second currency will be described.

As described above, in the process of step S82, the control section 31C controls the transport section 27 such that high-denomination money among the fit notes in the first currency which is to be collected and an unfit note are stored in the collection section 26 during a period in which the money handling apparatus 20C operates. Further, based on the operation performed on the operation display section 111 by the collection and delivery person outside the operating hours of the money handling apparatus 20C, the control section 31C controls the denomination-based storage section 241 and the transport section 27 so that the proceeds from sales in the first money storage section 24C are stored in a collection bag (hereinafter, referred to as a "first collection bag") of the collection section 26. In the case where the collection and delivery person gives an instruction for collecting the proceeds from sales in the first currency, the collection instruction may be made on the same menu screen as the product settlement instruction, or by launching another menu screen or another application that is different from that for the product settlement instruction and that can be operated by performing authentication. In addition, the collection instruction may be given by using a terminal apparatus that the collection and delivery person has. When the collection of the proceeds from sales in the first money storage section 24C is completed, the collection and delivery person performs an unlocking operation of the second locking mechanism 218 of the second unit 212 to take out the first collection bag from the collection section 26, and attaches another collection bag (hereinafter referred to as "second collection bag") to the collection section 26.

Thereafter, based on the operation performed on the operation display section 111 by the collection and delivery person, the control section 31C controls the denomination-based storage sections 251 and the transport section 27 such that the second currency in the second money storage section 25C is stored as proceeds from sales in the second collection bag of the collection section 26. In a case where the collection and delivery person gives an instruction for collecting the proceeds from sales in the second currency, the method exemplified in relation to the collection instruction for collecting the proceeds from sales in the first currency may be used. When the collection of the proceeds from sales in the second money storage section 25C is completed, the collection and delivery person takes out the second collection bag from the collection section 26, while attaching another collection bag to the collection section 26. Then, when the total amount of each of the first currency collected in the first collection bag and the second currency collected in the second collection bag is determined, the collection and delivery person deposits the collected first currency and the collected second currency into the bank account of the store.

Effect of Embodiment 5

The money handling apparatus 20C comprises the first money storage section 24C that stores the first currency, and the second money storage section 25C that stores the second currency. The money handling apparatus 20C dispenses the change in the first currency for the payment in the first currency, and also dispenses the change in the first currency for the payment in the second currency. It is thus possible for the client to make payment, for example, in both of the currency (the first currency) of a country in which the store is located and in the currency of another country (the second currency), and to receive change in the currency of the country in which the store is located, by utilizing one money handling apparatus 20C.

The control section 31C of the money handling apparatus 20C transports the first currency from the first money storage section 24C to the first collection bag of the collection section 26, and transports the second currency from the second money storage section 25C to the second collection bag of the collection section 26 at a timing that differs from the transport timing for the first currency. Therefore, it is possible to provide the money handling apparatus 20C which is capable of making payment in a plurality of currencies and collecting a plurality of currencies separately.

In particular, since a part of the first currency is collected during the operating hours of the money handling apparatus 20C, the collection process time for collecting the first currency performed outside the operating hours can be shortened.

[Variation]

Needless to say, the present disclosure is not limited to the embodiments described above, and various modifications can be made without departing from the spirit of the present disclosure.

Instead of the processes of steps S21 and S22 in the settlement process illustrated in FIG. 5 of Embodiment 2, the register-side control section 113 may perform a first deposit instruction that transmits, to the money handling apparatus 20, a command including both an execution instruction for performing the process in the settlement mode and the deposit instruction. In this instance, the register-side control section 113 may perform the withdrawal instruction of step S27 (transmit a command including only the withdrawal instruction), or, instead of the process of step S27, may perform a first withdrawal instruction that transmits, to the money handling apparatus 20, a command including both an execution instruction for performing the process in the settlement mode and the withdrawal instruction.

In the deposit process for deposit into the bank account illustrated in FIG. 6 of Embodiment 2, the register-side control section 113 may perform a second deposit instruction, which transmits, to the money handling apparatus 20, a command including both an instruction for performing the process in the ATM mode and the deposit instruction, instead of the processes in step S41 and step S22. In the withdrawal process for withdrawal from the bank account illustrated in FIG. 7, the register-side control section 113 may perform a second withdrawal instruction, which transmits a command including both an instruction for performing the process in the ATM mode and the withdrawal instruction to the money handling apparatus 20, instead of the processes of step S41 and step S51.

In the settlement process illustrated in FIG. 5 of Embodiment 2, the register-side control section 113 may instruct the money handling apparatus 20 to perform the process using the first money storage section 24, instead of giving the execution instruction for the process in the settlement mode in step S21. In the deposit process for deposit into the bank account illustrated in FIG. 6 and the withdrawal process for withdrawal from the bank account illustrated in FIG. 7, the register-side control section 113 may instruct the money handling apparatus 20 to perform the process using the second money storage section 25, instead of giving the execution instruction for performing the process in the ATM mode in step S41. In this case, based on the type of process selected by the client via operation display section 111, the register-side control section 113 determines which of the first money storage section 24 and the second money storage section 25 is to be used.

In Embodiment 2, instead of transporting the money (high-value banknote, unfit note) to be collected in the settlement process to the collection section 26, money recognized as the unfit note and money deposited after the denomination-based storage section 251 becomes full in the deposit process for deposit in the bank account may be transported to the collection section 26. The term "full" means a state in which the number of pieces of money stored in the denomination-based storage section 251 increases and a new piece of money cannot be stored in the denomination-based storage section 251. In this case, the collection and delivery person takes out the collection bag from the collection section 26, and when the amount of the money collected in the collection bag is determined, the collection and delivery person returns the money of the determined amount to the bank.

In Embodiment 2, a collection bag for collecting the money to be collected in the settlement process and the proceeds from sales of the store and a collection bag for collecting unfit notes in the deposit process for deposit into the bank account and money deposited after the denomination-based storage section 251 becomes full may be separately disposed in the collection section 26.

In Embodiment 2, the money handling system 10 may perform the money transport process between the first money storage section 24 and the second money storage section 25 as in Embodiment 3 or Embodiment 4. That is, the money handling system 10 may replenish the first money storage section 24 as a change fund with the money in the second money storage section 25, or may transfer a part of the money in the first money storage section 24 to the second money storage section 25 as a surplus. In this case, the register-side control section 113 may provide the bank server 13 with the replenishment amount of change fund, the surplus transfer amount, and the deposit and withdrawal information on the account of the store, or may store these pieces of information in the memory section 30 of the money handling apparatus 20.

In Embodiment 2, in addition to the second money storage section 25 that stores money to be deposited into or withdrawn from the bank account, a money handling section (hereinafter referred to as a "third money storage section") that stores a change fund for replenishment of the first money storage section 24 or stores money to be transferred from the first money storage section 24 may further be disposed in the second unit 212 of the money handling apparatus 20. In such a configuration, the first currency may be stored in the first money storage section 24, the second money storage section 25, and the third money storage section, and a money storage section (hereinafter, referred to as a "fourth money storage section") that stores the second currency may be further disposed in the second unit 212, such that it is possible to perform the settlement process accompanied by payment in the first currency or the second currency, the deposit/withdrawal process for deposit into or withdrawal from the bank account, the change fund replenishment process, or the surplus transfer process.

The disclosure of Japanese Patent Application No. 2021-077631, filed on Apr. 30, 2021, including the specification, drawings and abstract, is incorporated herein by reference in its entirety.

The invention claimed is:

1. A money handling method performed in a money handling apparatus comprising a first money storage section and a second money storage section that store money and dispense the money, the money handling method comprising:

when receiving a withdrawal instruction for a selected transaction based on a type of the selected transaction;
performing a withdrawal process relating to the selected transaction using the first money storage section in case that the selected transaction is a transaction relevant to a settlement process, and
performing a withdrawal process relating to the selected transaction using the second money storage section in case that the type of the selected transaction is a financial transaction; and when receiving a replenishment instruction to replenish a change fund used for the settlement process to the first money storage section, transporting money equivalent to a replenishment amount of the change fund from the second money storage section to the first money storage section.

2. The money handling method according to claim 1, wherein
the withdrawal instruction includes information on the type of the selected transaction or information on a money storage section to be used.

3. The money handling method according to claim 1, wherein:
in case that the selected transaction relates to the settlement process, deposit and withdrawal information on the first money storage section is provided to a management system of a store in which the money handling apparatus is installed, and
in case that the selected transaction relates to the financial transaction, deposit and withdrawal information on the second money storage section is provided to the management system.

4. The money handling method according to claim 1, wherein:
the first money storage section and the second money storage section store money of a same denomination, and
the withdrawal process is performed by selectively using the first money storage section and the second money storage section.

5. A money handling method performed in a money handling apparatus according to claim 1, further comprising:
when receiving the replenishment instruction, providing a management system of a financial institution to manage the financial transaction with deposit and withdrawal information regarding the replenishment amount.

6. A money handling apparatus, comprising:
a first money storage section and a second money storage section that store money such that the money is configured to be fed in or out of the first money storage section and the second money storage section, the first money storage section being used when a withdrawal process relating to a transaction relevant to a settlement process is performed, the second money storage section being used when a withdrawal process relating to a financial transaction is performed;
a first unit that houses the first money storage section;
a second unit that houses the second money storage section and comprises a locking mechanism configured to be unlocked by a person having a predetermined authorization; and
a control section configured to, when receiving a replenishment instruction to replenish a change fund used for a settlement process to the first money storage section, transport money equivalent to a replenishment amount of the change fund from the second money storage section to the first money storage section.

7. The money handling apparatus according to claim 6, wherein
the second unit comprises a locking mechanism managed by a financial institution.

8. The money handling apparatus according to claim 6, wherein the control section is further configured to:
receive a withdrawal instruction for a transaction based on a type of the transaction,
perform the withdrawal process using the first money storage section in case that the transaction is the transaction relevant to a settlement process, and
perform the withdrawal process using the second money storage section in case that the type of the transaction is the financial transaction.

9. The money handling apparatus according to claim 8, wherein
the withdrawal instruction includes information on the type of the transaction or information on a money storage section to be used.

10. The money handling apparatus according to claim 8, wherein:
in case that the transaction relates to the settlement process, the control section provides deposit and withdrawal information on the first money storage section to a management system of a store in which the money handling apparatus is installed, and
in case that the transaction relates to the financial transaction, the control section provides deposit and withdrawal information on the second money storage section to the management system.

11. The money handling apparatus according to claim 8, wherein:
the first money storage section and the second money storage section store money of a same denomination, and
the control section performs the withdrawal process by selectively using the first money storage section and the second money storage section.

12. The money handling apparatus according to claim 7, further comprising:
a control section, wherein:
the first money storage section and the second money storage section store first currency and second currency, respectively, and
the control section performs a deposit/withdrawal process using the first money storage section or a change dispensing process for dispensing change from the first money storage section for a deposit process for deposit in the second money storage section.

13. The money handling apparatus according to claim 12, further comprising:
a detachable collection section, wherein
the control section transports a part of the first currency to the detachable collection section during the deposit/withdrawal process performed using the first money storage section, the control section also being configured to transport the second currency in the second money storage section to the detachable collection section in response to an operation instruction by an operator outside operating hours of the money handling apparatus.

14. A money handling method performed in a money handling apparatus according to claim 6, wherein the control section is further configured to:
when receiving the replenishment instruction, provide a management system of a financial institution to manage the financial transaction with deposit and withdrawal information regarding the replenishment amount.

15. A money handling apparatus, comprising:
a first money storage section and a second money storage section that store money such that the money is configured to be fed in or out of the first money storage section and the second money storage section, the first money storage section and the second money storage section storing first currency and second currency, respectively;

a first unit that houses the first money storage section;

a second unit that houses the second money storage section and comprises a locking mechanism configured to be unlocked by a person having a predetermined authorization;

a detachable collection section; and a control section configured to perform a deposit/withdrawal process using the first money storage section or a change dispensing process for dispensing change from the first money storage section for a deposit process for deposit in the second money storage section, transport a part of the first currency to the detachable collection section during the deposit/withdrawal process performed using the first money storage section, and transport the second currency in the second money storage section to the detachable collection section in response to an operation instruction by an operator outside operating hours of the money handling apparatus.

\* \* \* \* \*